United States Patent [19]
Yoneda et al.

[11] Patent Number: 5,203,667
[45] Date of Patent: Apr. 20, 1993

[54] CARGO TRUCK WHICH CAN LOWER THE BODY TO THE GROUND IN A LEVEL POSITION

[75] Inventors: Takashi Yoneda; Takashi Asakura, both of Nishinomiya, Japan

[73] Assignee: Kyokuto Kaihatsu Kogyo Co., Ltd., Hyogo, Japan

[21] Appl. No.: 675,254

[22] Filed: Mar. 27, 1991

[30] Foreign Application Priority Data

| Mar. 28, 1990 | [JP] | Japan | 2-79559 |
| Oct. 30, 1990 | [JP] | Japan | 2-294605 |
| Oct. 30, 1990 | [JP] | Japan | 2-294606 |
| Oct. 30, 1990 | [JP] | Japan | 2-294608 |

[51] Int. Cl.⁵ ............... B60P 1/64; B60P 3/12
[52] U.S. Cl. ........................ 414/477; 414/498
[58] Field of Search .................... 414/477–480, 414/491–494, 498, 500, 909

[56] References Cited

U.S. PATENT DOCUMENTS

| 1,269,265 | 6/1918 | Duggar | 414/500 |
| 1,562,364 | 11/1925 | Reasoner | 414/500 |
| 1,567,478 | 12/1925 | Vonnez et al. | 414/500 |
| 2,665,020 | 1/1954 | Whittle | 414/500 |
| 3,684,112 | 8/1972 | Wijers | 414/500 |
| 3,897,882 | 8/1975 | Budoff | 414/500 |
| 4,225,280 | 9/1980 | Brunet et al. | 414/479 |

FOREIGN PATENT DOCUMENTS

| 0362096 | 4/1990 | European Pat. Off. |  |
| 2243167 | 12/1973 | Fed. Rep. of Germany |  |
| 3003265 | 8/1981 | Fed. Rep. of Germany | 414/477 |
| 572573 | 6/1924 | France |  |
| 2155043 | 5/1973 | France |  |
| 61-43623 | 12/1986 | Japan |  |
| 1230886 | 5/1986 | U.S.S.R. | 414/500 |
| 1151044 | 5/1969 | United Kingdom |  |

*Primary Examiner*—David A. Bucci
*Attorney, Agent, or Firm*—Wenderoth, Lind & Ponack

[57] ABSTRACT

A cargo truck has a lift frame which is mounted on a chassis thereof in a tiltable and slidable manner and has on a back end of the lift frame a curved member which curves downward. The lift frame is tilted so that a back end of the lift frame descends while the lift frame is slid to the rear with respect to the chassis. Thus, the curved member of the lift frame contacts the ground. Then, a body is slid along the lift frame backward by a body drive device, a front of the body is slid along the curved member at a back of the lift frame and lowered, and the body is lowered in an approximately level manner to the ground. Then freight is loaded onto the body lowered level to the ground and is tied down.

10 Claims, 22 Drawing Sheets

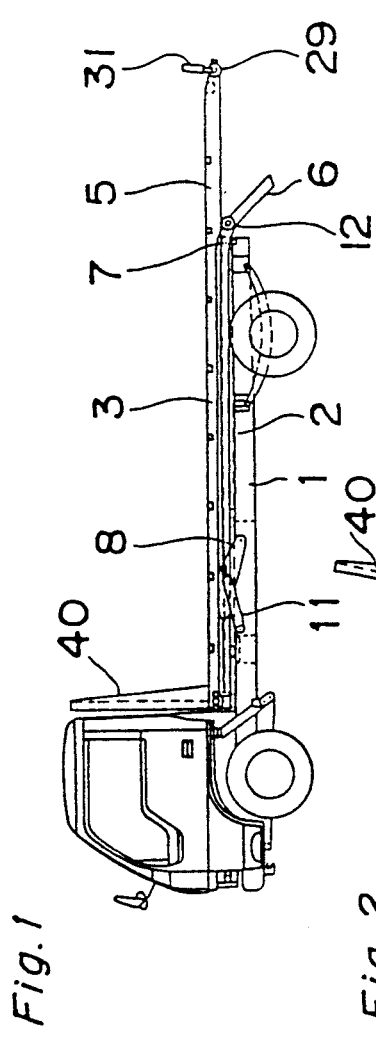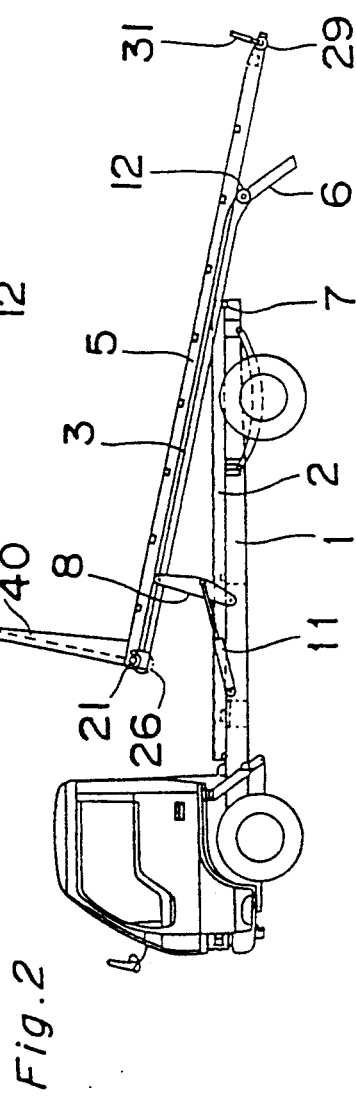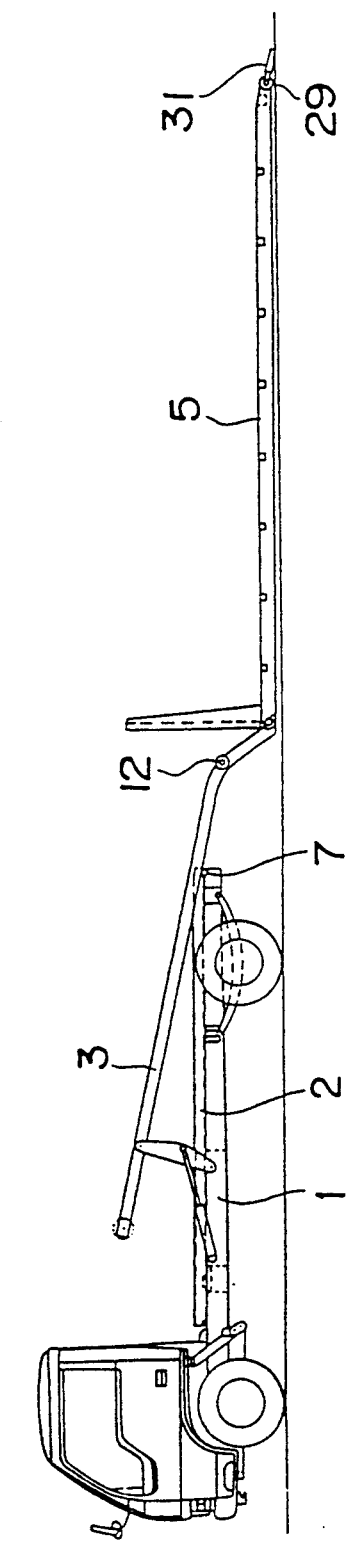

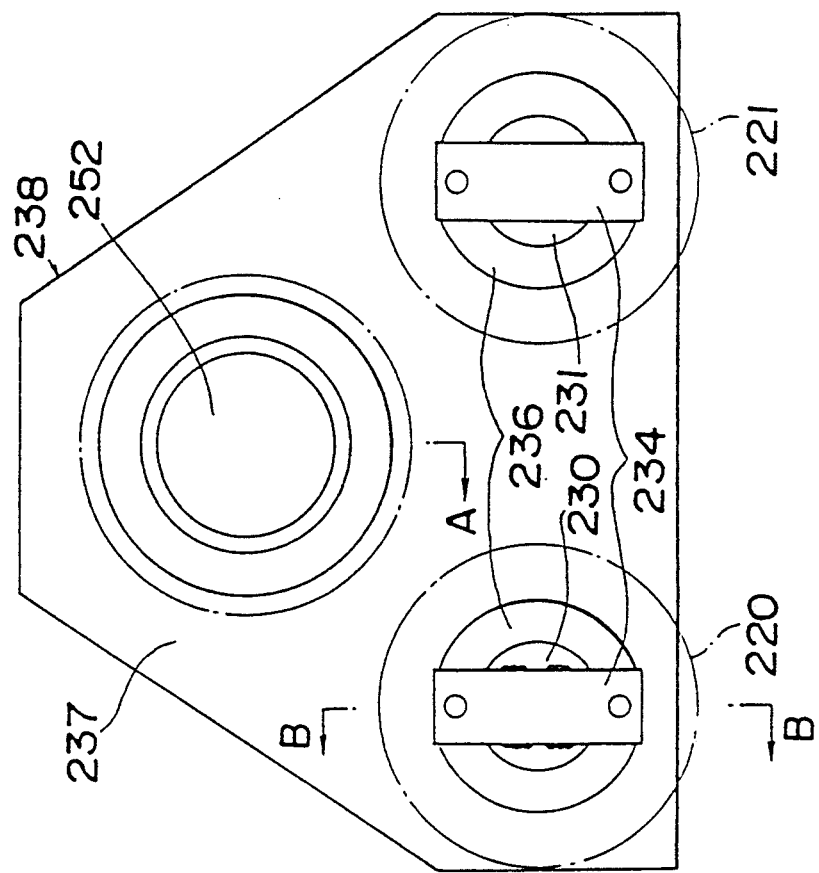
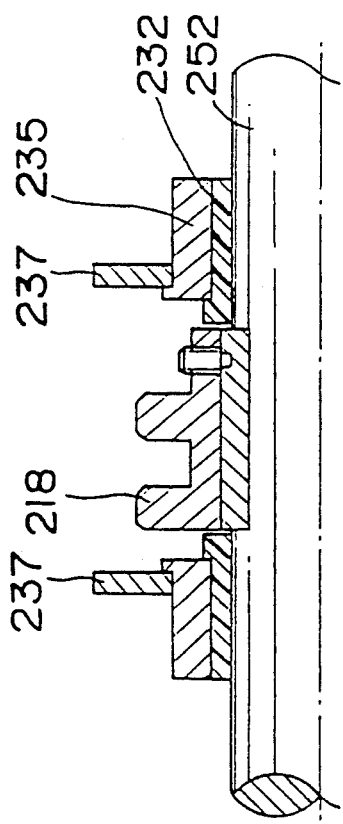
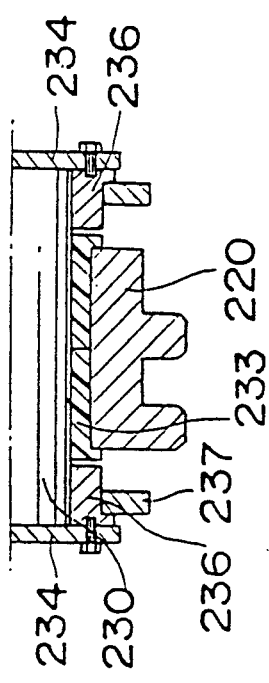

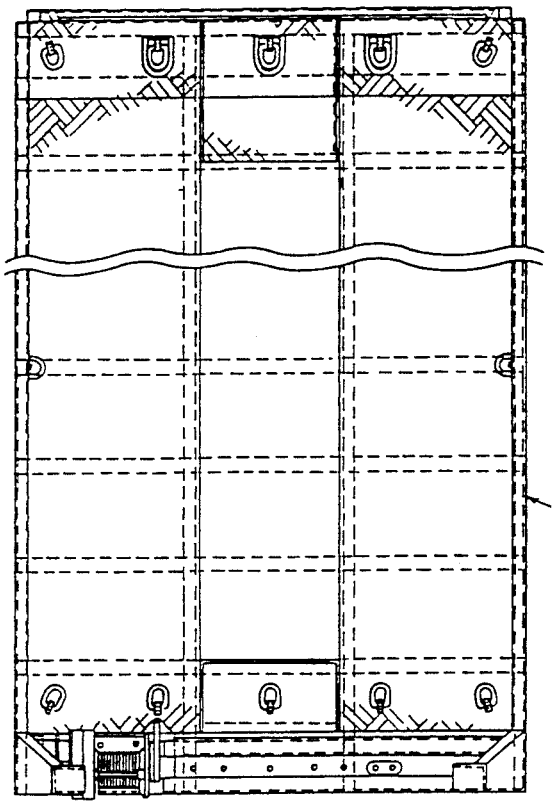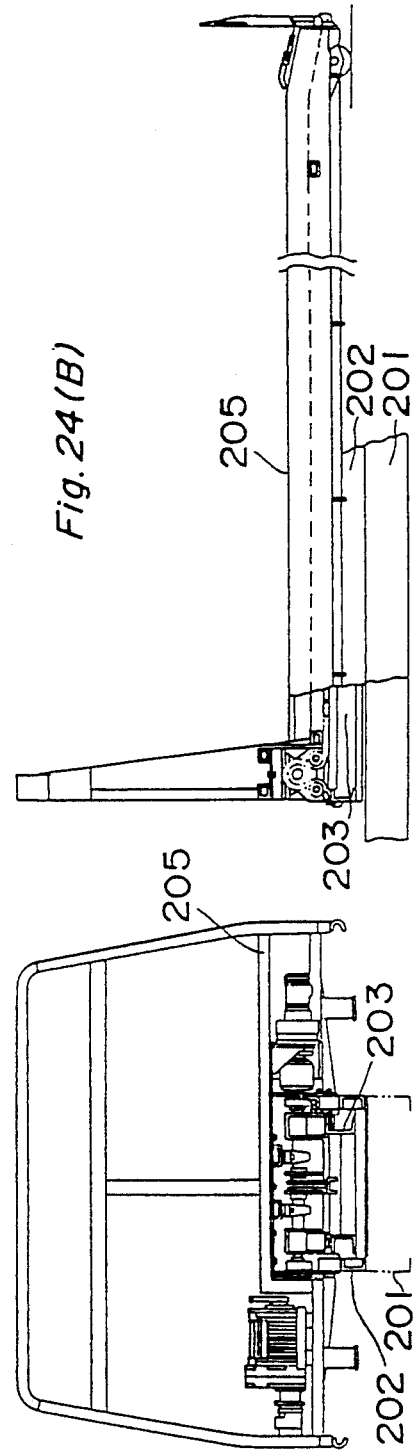
Fig. 24(A)
Fig. 24(B)
Fig. 24(C)

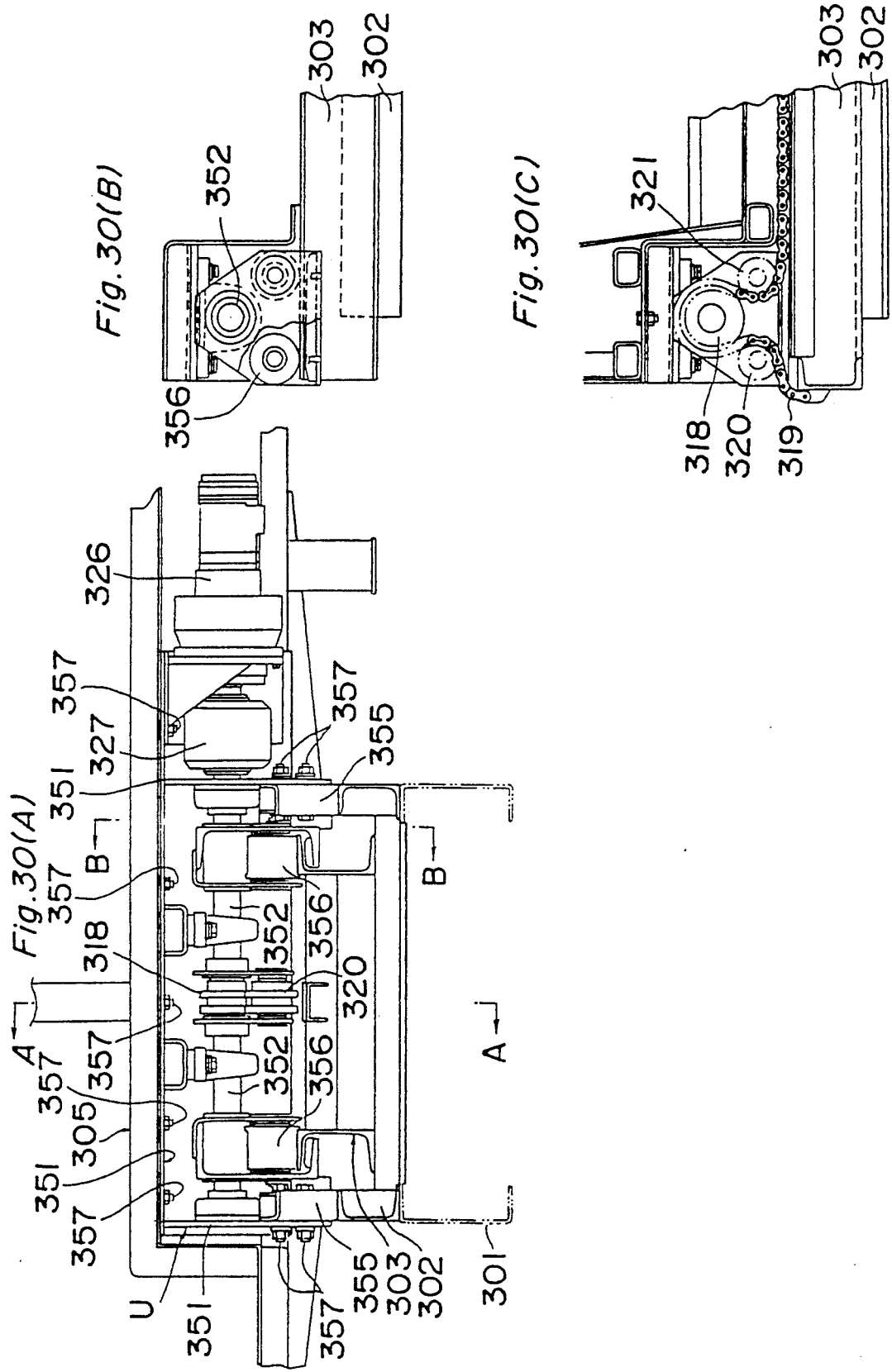

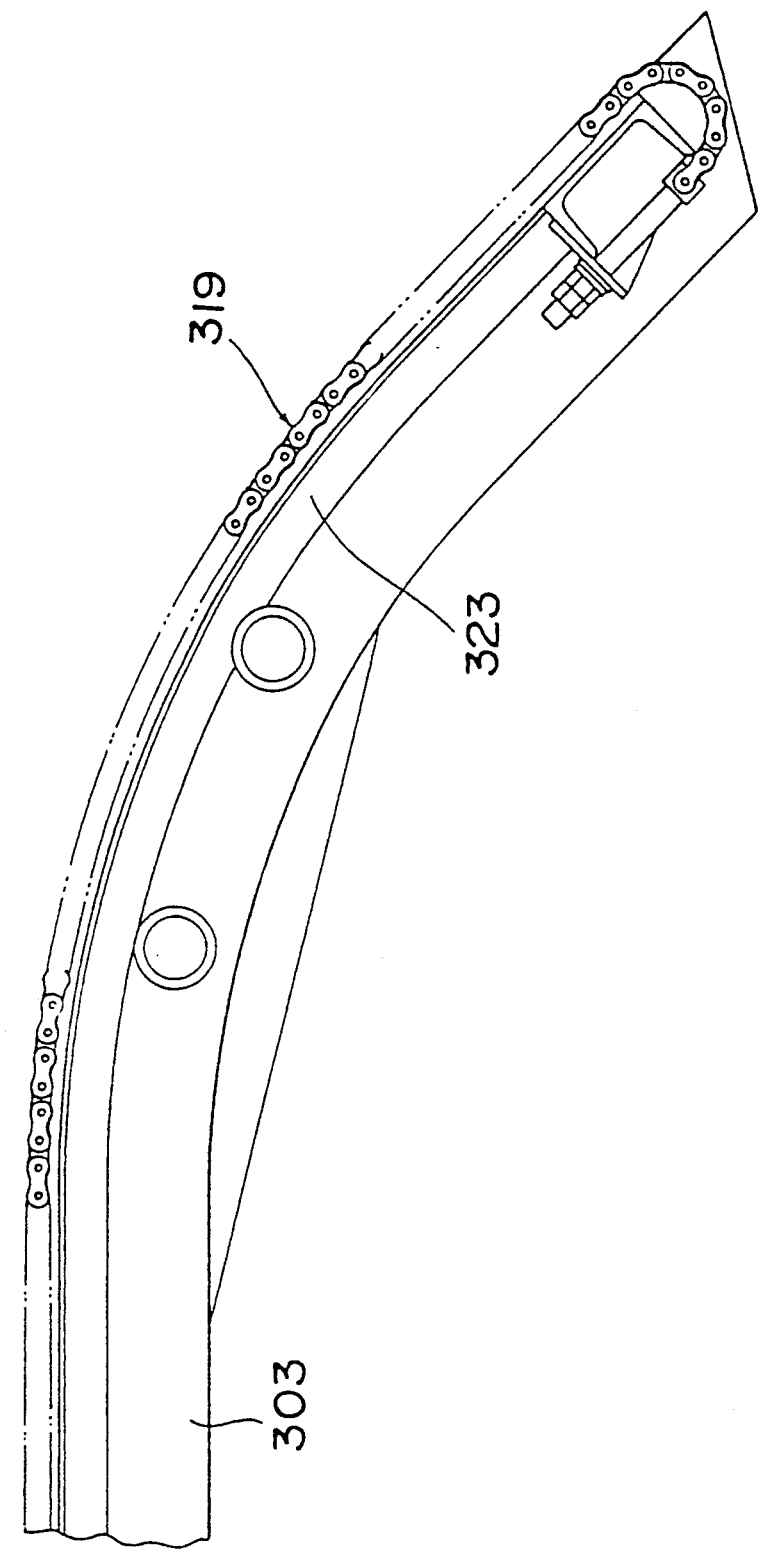

CARGO TRUCK WHICH CAN LOWER THE BODY TO THE GROUND IN A LEVEL POSITION

BACKGROUND OF THE INVENTION

The present invention relates to a cargo truck which can lower the body to the ground in a level position.

One type of conventional cargo truck slides the body diagonally from the subframe along guide rails with the body obliquely spanning between the ground and the subframe for loading freight onto the body (Japanese Utility Model Laid-Open Publication showa 61-43623).

However, the conventional cargo truck as thus described has the following disadvantages.

(1) The following problems result because the body is at an angle to the ground, and the freight is loaded onto the body on a slope.

(A) It is difficult to load the freight because it is loaded onto the body at an angle.

(B) When loading a motor vehicle onto the body, the driver of the motor vehicle being loaded can easily feel anxiety when driving the vehicle on the body because the front of the vehicle is raised, and it is not possible to load the vehicle to the very front of the body.

(C) It is dangerous when the driver of the vehicle being loaded gets out of the vehicle loaded on the body because the driver must get out onto a narrow edge of the body which is diagonal to the ground.

(D) When the freight is secured the body, it is difficult to secure the freight to the body because the body is at an angle to the ground.

(E) Because the body is at an angle to the ground, it is difficult to load freight from the side of the body. In addition, it is not possible to load a vehicle onto the body from the side.

(2) Because the body is at an angle to the ground along the full length of the body between the ground and the subframe, support members are required to prevent the vehicle from rolling back when freight is loaded onto the body.

SUMMARY OF THE INVENTION

Therefore, an object of the present invention is to provide a cargo truck which can lower the body to the ground in a horizontal position for freight loading, and does not require any special support members.

To achieve the aforementioned object, a cargo truck according to the present invention is characterized by a lift frame which is mounted on a chassis of the cargo truck in a tiltable and slidable manner and has on a back end of the lift frame a curved member which curves downward. A lift frame drive means tilts and slides the lift frame on the chassis. A body is mounted in a slidable manner on the lift frame, is slid along the curved member for raising and lowering, and is approximately level when the body is lowered to the ground. A body drive means slides the body on the lift frame.

It is preferred that the curved member of the lift frame be so constituted that it contacts the ground when the body is loaded on the lift frame.

By means of the lift frame drive means, the lift frame is tilted so that the back end of the lift frame descends while the lift frame is slid to the rear with respect to the chassis. Thus, the curved member of the lift frame contacts the ground or is in a position very close to the ground. Then the body is slid along the lift frame toward the back by the body drive means, the front of the body is slid along the curved member at the back of the lift frame and lowered, and the body is lowered in an approximately level manner to the ground. Then the freight is loaded onto the body lowered level to the ground and is tied down. It is preferred that the bottom end of the curved member of the lift frame is in contact with the ground at this time. Next, the body drive means is operated to lift the body along the curved member of the lift frame, and the body is slid along the lift frame to the front. After that, the lift frame is returned to a horizontal position by the lift frame drive means.

As thus described, the load is applied to the back end of the chassis when the body is loaded onto the lift frame, but when the bottom end of the curved member of the lift frame contacts the ground, it functions as a support member which also prevents the chassis from rolling backwards.

A further object of the present invention is to provide a cargo truck which can automatically control the operational timing of the lift frame and body using a position detection means.

To achieve the aforementioned object, according to the present invention, there is provided a cargo truck comprising a lift frame which is provided on a chassis of the cargo truck and tiltable by means of a first drive means between a down position approximately parallel to the chassis and an up position wherein a front of the lift frame is raised and a back of the lift frame is down, and a body which is guided in a front-back direction by the lift frame, and is movable by means of a second drive means between a front position on the lift frame and a back position on a road. A first detection means detects the front position of the body. A second detection means detects the down position of the lift frame. A control means moves the body forward by operating a second drive means in a forward drive direction when a body forward movement switch is manually operated when the body is in the back position, stops forward drive operation of the second drive means and lowers the lift frame by operating the first drive means in a lowering direction when the first detection means detects the front position of the body, and stops the lowering operation of the first drive means when the second detection means detects the down position of the lift frame.

The cargo truck as thus described comprises the first detection means which detects the front position of the body and the second detection means which detects the down position of the lift frame. By the control means body is moved forward by operating the second drive means in the forward drive direction when the body forward movement switch is manually operated with the body in the back position, and then stops the forward drive operation of the second drive means and lowers the lift frame by operating the first drive means in a lowering direction when the first detection means detects the front position of the body, and stops the lowering operation of the first drive means when the second detection means detects the down position of the lift frame.

Thus, by manual operation of only the forward movement switch for forward body movement, the body which is in the back position on the road surface can be moved forward to the front position of the lift frame, and the lift frame in the up position can be lowered to the down position.

Also, there is provided a cargo truck comprising a lift frame which is provided on a chassis of the cargo truck and tiltable by means of a first drive means between a down position approximately parallel to the chassis and an up position wherein a front of the lift frame is raised and a back of the lift frame is down, and a body which is guided in a front-back direction by the lift frame, and is movable by means of a second drive means between a front position on the lift frame and a back position on a road. A third detection means detects the up position of the lift frame. A control means raises the lift frame by operating a first drive means in a lifting direction when a backward body movement switch is manually operated when the body is in the front position, stops the lifting operation of the first drive means and moves the body back by driving a second drive means in a backward drive direction when the third detection means detects the up position of the lift frame, and stops the backward movement operation of the second drive means when the body is in the back position.

The cargo truck as thus described comprises the third detection means to detect the up position of the lift frame, and by means of the control means, raises the lift frame by operating the first drive means in a lifting direction when the backward body movement switch is manually operated with the body in the front position, and then stops the lifting operation of the first drive means and moves the body back by driving the second drive means in a backward drive direction when the third detection means detects the up position of the lift frame, and stops the backward movement operation of the second drive means when the body is in the back position.

Thus, by manual operation of only the backward body movement switch for the backward movement body movement, the lift frame which is in the down position on the chassis is automatically raised, and the body in the front position on the lift frame can be moved to the back position on the road.

A further object of the present invention is to provide a cargo truck which can slide the body smoothly on a lift frame having a curved member.

To achieve the aforementioned object, a cargo truck according to the present invention is characterized by a lift frame which is mounted on a chassis of the cargo truck in a tiltable manner and has on a back end of the lift frame a curved member which curves downward. A body is mounted in a slidable manner on the lift frame and is slid along the curved member for raising and lowering. A body drive means slides the body on the lift frame.

The body drive means further comprises a drive shaft which is driven by a motor mounted at a front of the body, a sprocket with which is engaged a chain provided on the lift frame and which is fixed to the drive shaft, a bracket which is mounted on the drive shaft so that the bracket can rock freely, and a pair of idlers mounted on said bracket and with which are engaged the chain provided on the lift frame.

According to the abovementioned structure, the pair of idlers with which are engaged the chain provided on the lift frame are mounted on the bracket which is mounted so that it can rock freely on the drive shaft which is driven by the motor mounted at the front of the body. When the front of the body slides over the curved member of the lift frame, the pair of idlers swing together with the bracket in relation to the body, and are aligned in the direction of curvature of the curved member. Thus, when the front of the body slides over the curved member, the engagement amount between the idlers and the chain provided on the lift frame remains constant, and the body is thus able to slide smoothly over the lift frame comprising the curved member.

A further object of the present invention is to provide a cargo truck to which the assembly which drives the body can be easily and simply assembled and removed, and for which the assembly which drives the body can be easily maintained, inspected, and repaired.

To achieve the aforementioned object, a cargo truck according to the present invention is characterized by a lift frame which is mounted on a chassis of the cargo truck in a tiltable manner and has on a back end of the lift frame a curved member which curves downward. A body is mounted in a slidable manner on the lift frame and is slid along the curved member for raising and lowering. A drive unit includes a housing, a motor, a drive shaft which is driven by the motor, and a sprocket with which is engaged a chain provided on the lift frame and which is fixed to the drive shaft. The drive unit slides the body with respect to the lift frame, the housing thereof being fixed by bolts to a front of the body in a removable manner.

Because the housing of the drive unit which slides the body with respect to the lift frame is secured by bolts in a removable manner to the front of the body, the drive unit, which drives the body and includes the housing, motor, drive shaft driven by the motor, and sprocket with which is engaged the chain provided on the lift frame and which is fixed to the drive shaft, can be easily mounted to and removed from the body front. This makes it easy and simple to assemble and remove the drive unit which drives the body from the body, and to maintain, inspect, and repair the drive unit.

BRIEF DESCRIPTION OF THE DRAWINGS

The present invention will become more fully understood from the detailed description given below and the accompanying drawings, wherein:

FIGS. 1, 2, 3, and 4 are schematic side views of an operation of a cargo truck according to a first embodiment of the present invention, FIGS. 23(A)-(C) are diagrams of a bracket in the third embodiment, FIGS. 24 (A) and (B) are views from the front and side of a chassis, respectively, and FIG. 24 (C) is a top view of a body, in the third embodiment, FIGS. 30(A)-(C) are detailed drawings of a drive unit area in the fourth embodiment, FIG. 31 is a diagram of the back end of a lift frame and chain in the fourth embodiment, and FIGS. 32 (A), (B), and (C) are views from the front, side, and top of members on a chassis in the fourth embodiment.

DESCRIPTION OF PREFERRED EMBODIMENTS

Figure 4:
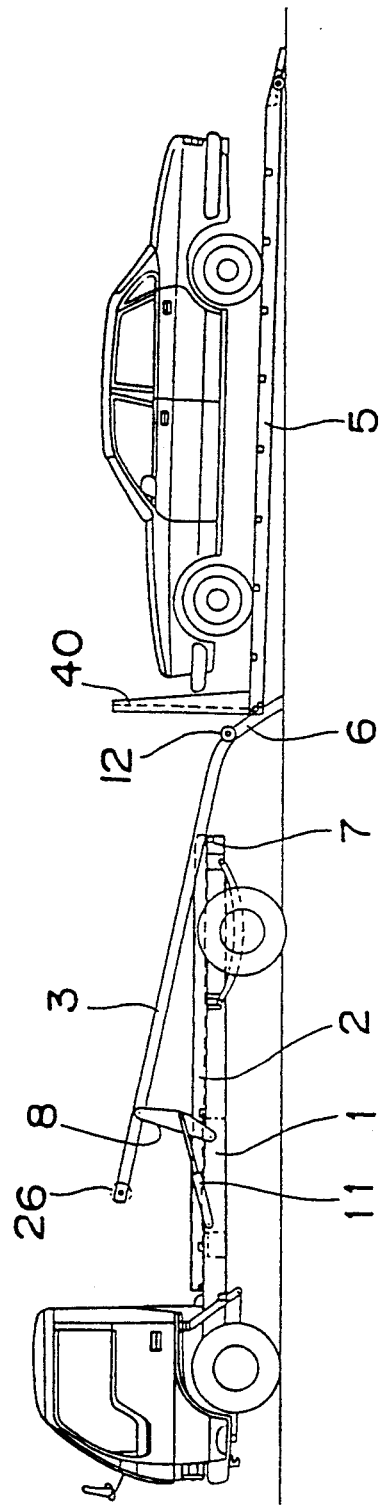

Before the description of the present invention proceeds, it is to be noted that like parts are designated by like reference numerals throughout the accompanying diagrams.

First Embodiment

As shown in FIGS. 1 and 2, this first embodiment comprises a chassis frame 1, subframe 2, lift frame 3, and body 5. The chassis frame 1 and the subframe 2 together form the chassis. The lift frame 3 has a curved member 6 which curves down toward the ground at the back end of the lift frame 3, and can be slid over guide rollers 7 at the back of the chassis frame 1. At the front end of the lift frame 3 pivots one end of a lift arm 8, the other end of which pivots on the chassis frame 1.

At approximately the center of the lift arm 8 pivots one end of a lift cylinder 11, the other end of which pivots on the chassis frame 1. By operating this lift cylinder 11, the lift frame 3 is slid toward the back along the rollers 7 and the front is raised to tilt the lift frame 3. As shown in FIGS. 2 and 3, the bottom end of the curved member 6 at the back of the lift frame 3 almost contacts the ground when the lift frame 3 is slid all the way back and down as far as it will travel. The lift arm 8 and lift cylinder 11 thus form a lift frame drive means.

Figure 5:
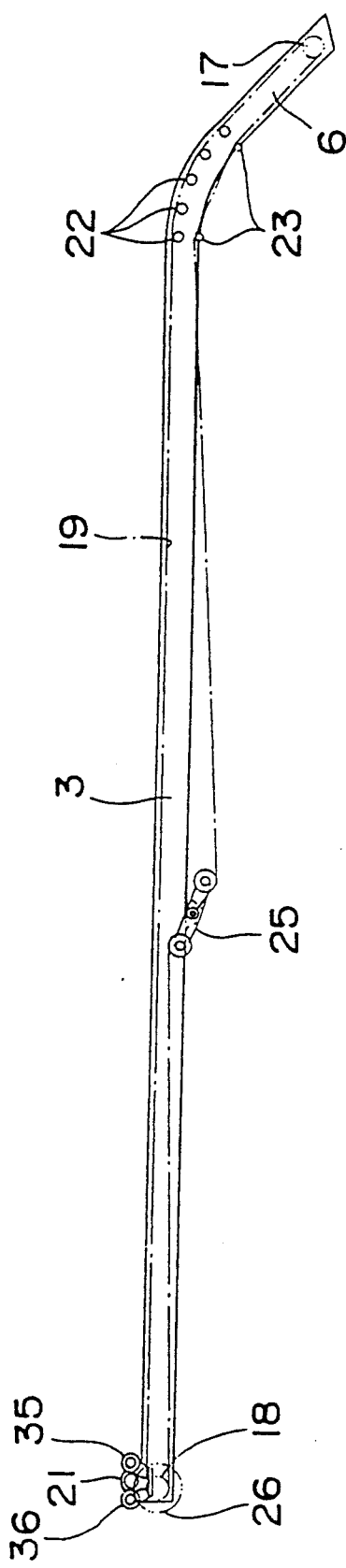
FIG. 5 is an enlarged side view of a lift frame.

A guide roller 12 is provided at a boundary position between the horizontal member and curved member 6 of the lift frame 3 to guide the body 5 as it slides along the lift frame 3. The sliding mechanism of the body 5 is shown in FIG. 5.

Specifically, sprockets 17 and 18 are provided at the back and front ends of the lift frame 3, respectively, and a chain 19 is mounted on both sprockets 17 and 18. A bracket 21 connected to the chain 19 is also provided and connected with the body 5. Plural chain guides 22 and 23 are provided along the outside and inside curves, respectively, of the curved member 6 of the lift frame 3 to guide the chain 19. In addition, a tensioner 25 is also provided at the center bottom of the lift frame 3 to apply tension to the chain 19. The sprocket 18 is driven by a hydraulic motor 26. Thus, by driving the bracket 21 forward or back by driving the chain by means of the hydraulic motor 26, the body 5 slides along all the lift frame 3, including the curved member 6 thereof. The sprockets 17 and 18, chain 19, bracket 21, and hydraulic motor 26 form a body or pallet drive means.

Figure 7:
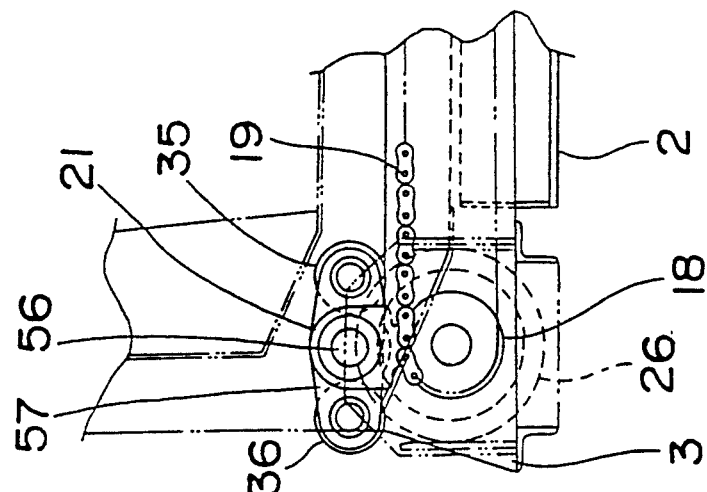
FIG. 7 is a side view of the location of the sprocket and hydraulic motor.
Figure 6:
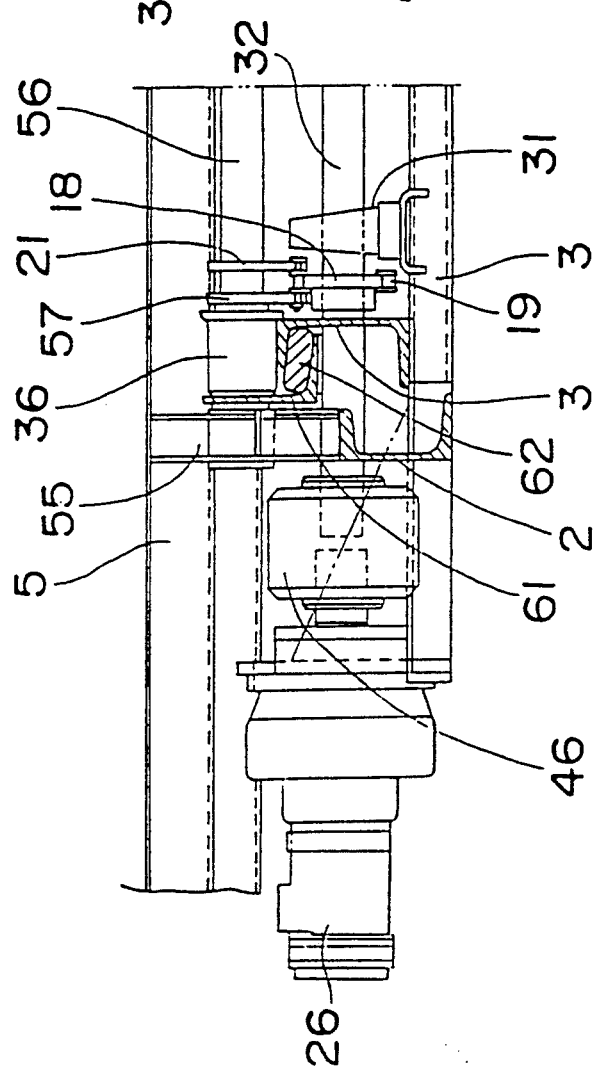
FIG. 6 is a partly sectional enlarged view of a sprocket and hydraulic motor section.

The structure and operation of the bracket 21 and hydraulic motor 26 section is described below with reference to FIGS. 6 and 7. The front sprocket 18 of the lift frame 3 is fixed to a shaft 32, which is mounted so as to enable free rotation in the bracket 31 fixed to the lift frame 3. To one end of this shaft 32 is connected an output shaft of the hydraulic motor 26, which is mounted on the lift frame 3, by way of a coupling 46. The chain bracket 21 fixed to the chain 19 mounted on the sprockets 17 and 18 is mounted so as to enable a free rocking action of the bracket 21 on a shaft 56, which is fixed to a main pillar 55 of the body 5. To a bracket 57, which is mounted so as to enable a free rocking action thereof on the shaft 56, are mounted guide rollers 35 and 36 on both sides of the chain bracket 21. These guide rollers 35 and 36 are rolled along the top side of the lift frame 3, which is made of a channel-shaped member, to slide the body 5 along the lift frame 3.

A guide plate 61 with an L-shaped cross section is provided on the shaft 56 in a position between the main pillar 55 of the body 5 and the rollers 35 and 36 mounted on the body 5 by way of the shaft 56 and bracket 57, and a pad 62 is provided on the top side of the horizontal member of the guide plate 61. Then, while sliding the pad 62 on the bottom surface of the top side of the lift frame 3 with a channel shape, the body 5 is held in the vertical direction to the lift frame 3 by means of the guide plate 61 and the pad 62 so that the front edge of the body 5 does not ride up and separate from the lift frame 3, and particularly from the curved member 6. Thus, when the front of the body 5 moves along the curved member 6 of the lift frame 3, the guide rollers 35 and 36 move along the curved member 6 due to the rocking action of the brackets 21 and 57, and separation of the body 5 from the lift frame 3 is prevented by the guide plate 61.

Furthermore, as shown in FIGS. 1 and 2, a roller 29 and tailgate 31, which also functions as a ramp, are provided at the back edge of the body 5. A vertical plate 40 is also provided at the front end of the body 5.

Freight, and specifically a motor vehicle by way of example, is loaded onto a cargo truck constructed as thus described as follows.

Starting from the position of the cargo truck shown in FIG. 1, the lift cylinder 11 is extended, causing the lift frame 3 to slide toward the back over the rollers 7 by way of the lift arm 8 until the lift frame 3 is tilted at the back as shown in FIG. 2.

The hydraulic motor 26 is then driven to drive the chain 19 by way of the sprocket 18 along the chain guides 22 and 23, and the tensioners 25. This drives the body 5 together with the brackets 21 and 57 toward the back along the lift frame 3 until the front of the body 5 is lowered following the curved member 6. At this time, the roller 29 at the back of the body 5 contacts the ground to enable the body 5 to move smoothly back over the ground. It is to be noted that the tailgate 31 is raised at this time.

In this way, the guide rollers 35 and 36 support the front edge of the body 5 on the lift frame 3 as the body 5 is slid to the back, and the back edge and center of the body 5 are supported by the guide roller 12 provided at the back side of the lift frame 3. In addition, separation of the front of the body 5 from the lift frame 3, and particularly from the curved member 6, is prevented by the guide plate 61 sandwiching the horizontal member of the lift frame 3 between the guide rollers 35 and 36 and the pad 62.

When the body 5 is lowered as far as it will travel along the curved member 6 of the lift frame 3, the body 5 is in the position shown in FIG. 3, at which point the body 5 is approximately level with the ground. The tailgate 31 is then lowered to the ground, and the motor vehicle can be loaded onto the body 5.

Because the motor vehicle can thus be loaded onto the body 5 with the vehicle level, feelings of anxiety are not aroused in the driver, and the vehicle can be driven all the way forward onto the body 5 as shown in FIG. 4. It is therefore easy to load a motor vehicle onto the truck body. In addition, the driver is able to get out from the loaded vehicle in a manner which is not dangerous, because the body 5 and motor vehicle are level with the ground. Moreover, when a motor vehicle or other freight is loaded onto the body 5 in this horizontal position and the freight is secured to the body 5, the freight can be secured more easily and there is no danger of the freight rolling off because the body 5 is in a horizontal position. Furthermore, because freight is loaded with the body 5 in a horizontal position, freight can be loaded not only from the back but also from the sides of the body.

Next, the hydraulic motor 26 is driven to drive the chain 19 and sprockets 17 and 18 to lift the body 5 along the curved member 6, and then pull the body 5 forward along the lift frame 3. At this time the bottom end of the curved member 6 of the lift frame 3 is driven down to contact the ground as shown in FIG. 4 by the weight of the motor vehicle. The curved member 6 of the lift frame 3 thus acts as a supporting block to prevent the cargo truck from rolling back.

After the body 5 is advanced sufficiently forward on the lift frame 3 as shown in FIG. 2, the lift cylinder 11 is retracted to return the lift frame 3 to a horizontal position by way of the lift arm 8 and slide the lift frame 3 forward with respect to the subframe 2 until the position shown in FIG. 1 is resumed. Because the curved member 6 of the lift frame 3 is raised from the ground at this time, there is no danger of the curved member 6 striking any obstacles on the road during normal driving.

In this first embodiment the body drive means was comprised of the hydraulic motor 26, chain 19, and sprockets 17 and 18, but it shall not be so limited and may be comprised of a rope and pulley system. In addition, the lift arm drive means was comprised of a lift cylinder 11 and lift arm 8, but it shall not be so limited and may be comprised of any assembly which enables the lift frame to be tilted and slid. Furthermore, the lift frame 3 in this embodiment is able to slide along the subframe 2, but it may also be constructed to slide along the chassis frame without using a subframe. Moreover, the hydraulic motor is mounted on the lift frame, but it may likewise be mounted on the body.

As will be known from the above description, a cargo truck according to a first embodiment of the present invention enables loading freight onto the body of the cargo truck in a horizontal position because a lift frame which is mounted on the chassis in a tiltable and slidable manner and which comprises a curved member which curves downward on the back end is slid to the back by a lift frame drive means and tilted, and the body is slid over the lift frame by a body drive means and lowered along the curved member to a horizontal position on the ground. Thus, according to this first embodiment, freight can be easily loaded onto the body, and in the case of a motor vehicle feelings of anxiety are not aroused in the driver because the vehicle is loaded in a horizontal position, and it is further possible to load the vehicle as far forward on the body as possible. In addition, the driver can get out from the vehicle safely because the body is flat on the ground. In addition, because the freight can be secured to the body in a horizontal position, the securing operation can be completed more easily. In addition, freight can be loaded onto the body from either the sides or the back because the body is flat on the ground.

Furthermore, because the curved member of the lift frame contacts the ground when freight is loaded on the body, the curved member acts as a support member, thus preventing the cargo truck from rolling back with a mechanism of simple assembly.

Second Embodiment

Figure 9:
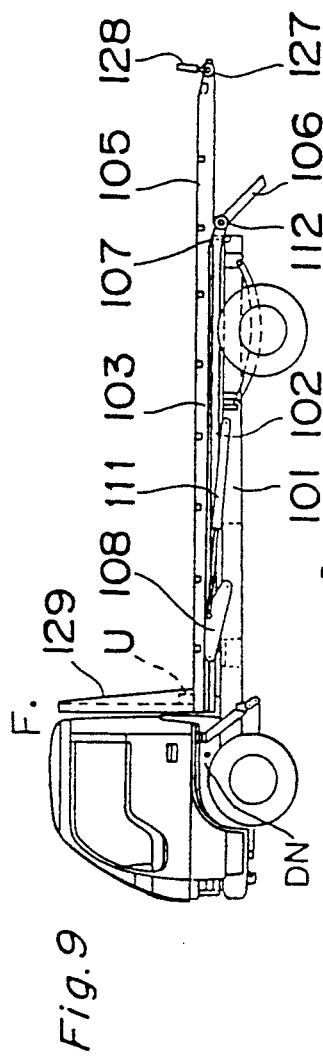
FIGS. 9, 10, and 11 are side views of the cargo truck according to the second embodiment with the body loaded, being lowered, and when down, respectively.
Figure 10:
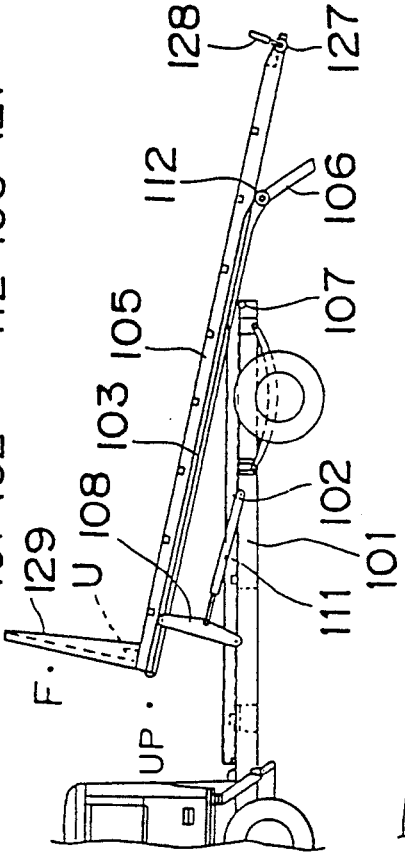

As shown in FIGS. 9 and 10, a cargo truck of the second embodiment comprises a chassis frame 101, subframe 102, lift frame 103, and body 105. The chassis frame 101 and the subframe 102 together form the chassis. The lift frame 103 has a curved member 106 which curves down toward the ground at the back end of the lift frame 103, and can be slid over guide rollers 107 at the back of the chassis frame 101.

At the front end of the lift frame 103 pivots one end of a lift arm 108, the other end of which pivots on the subframe 102, and at approximately the center of the lift arm 108 pivots one end of a lift cylinder 111 (a first drive means), the other end of which pivots on the subframe 102. When the lift arm 108 swings up due to the lifting operation of the lift cylinder 111, the lift frame 103 is forced toward slide to the back and tilt so that the back edge thereof descends toward the ground.

Figure 11:
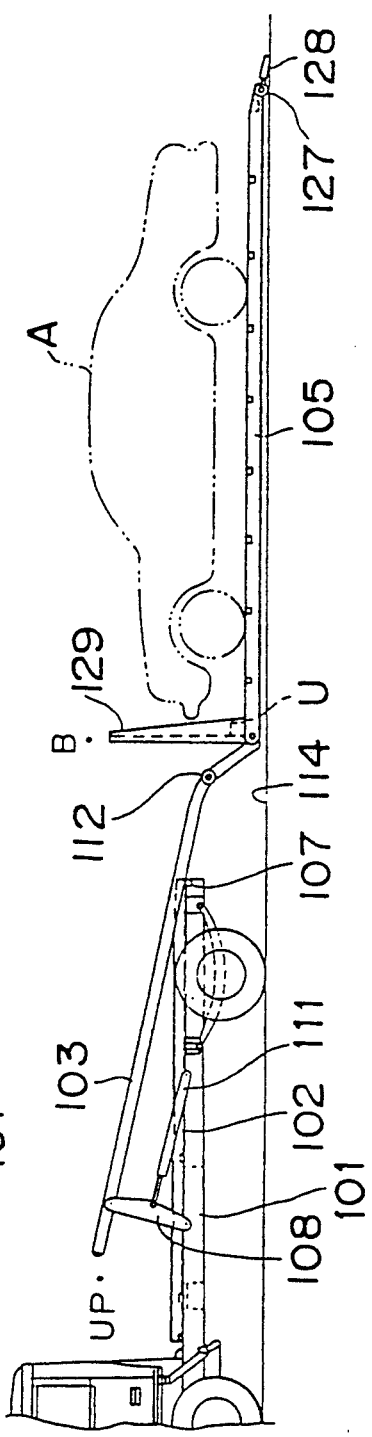
Figure 12:
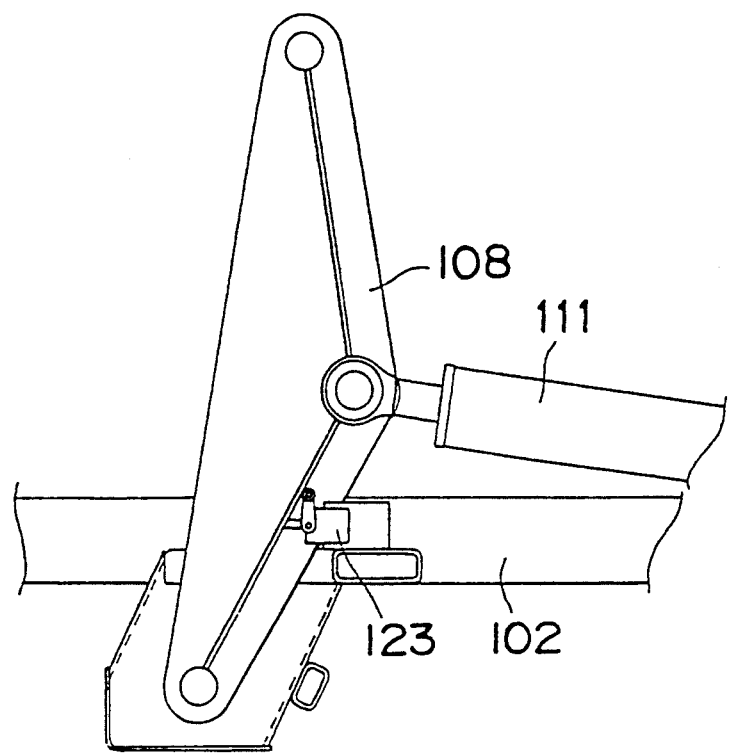
FIG. 12 is a side view showing the relationship between a lift arm and a limit switch.

As shown in FIGS. 10 and 11, the bottom end of the curved member 106 at the back of the lift frame 103 almost contacts the ground when the lift frame 103 is slid all the way back and down as far as it will travel at an angle.

A guide roller 112 is provided at a boundary position between a horizontal member and the curved member 106 in the lift frame 103 to guide the body 105 as it slides along the lift frame 103.

Figure 13:
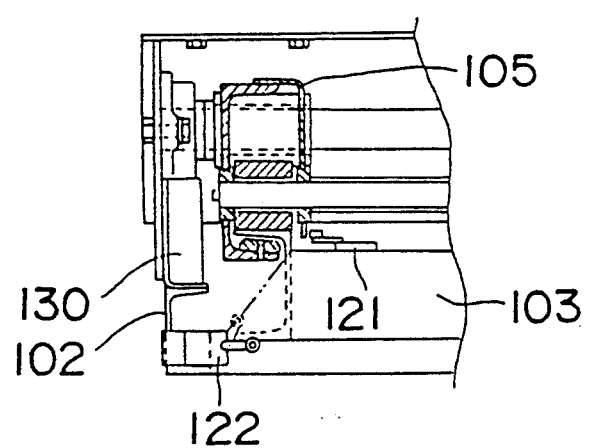
FIG. 13 is a front view showing the relationship between a subframe, lift arm, and body and limit switch.

It is to be noted that when the cargo truck is in the position shown in FIG. 9, a main member 130 of the body 105, which extends in the longitudinal direction of the body 5, is on the subframe 102 (see FIG. 13).

Figure 17:
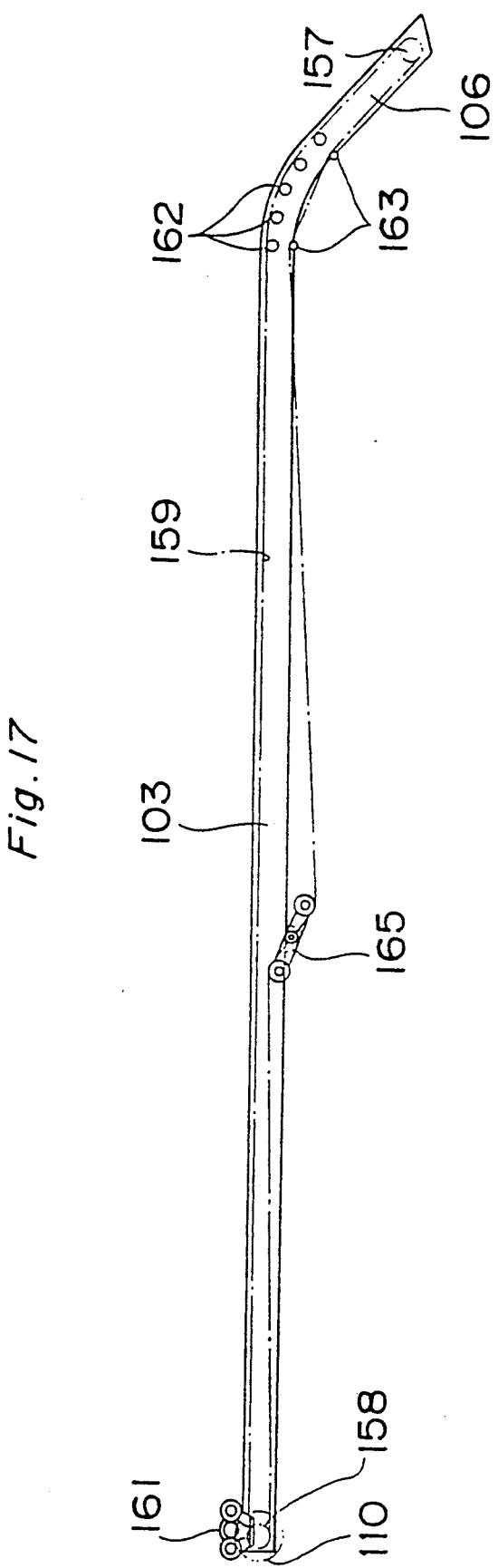
FIG. 17 is a side view of a body slide mechanism.

This body 105 is slid over the lift frame 103 by the body drive means shown in FIG. 17. Specifically, sprockets 157 and 158 are provided at the back and front of the lift frame 103, and a chain 159 is engaged with the sprockets 157 and 158. A bracket 161 connected to the chain 159 is also provided connected with the body 105. Plural chain guides 162 and 163 are provided along the outside and inside curves, respectively, of the curved member 106 of the lift frame 103 to guide the chain 159. In addition, a tensioner 165 is also provided at the center bottom of the lift frame 103 to apply tension to the chain 159. The sprocket 158 is driven by a hydraulic motor 110 (a second drive means, see FIG.

15) of a hydraulic drive unit U. Thus, by driving the bracket 161 forward or back by driving the chain 159 by means of the hydraulic motor 110, the body 105 slides along all the lift frame 103, including the curved member 106 thereof. The sprockets 157 and 158, chain 159, bracket 161, and hydraulic motor 110 form the body drive means.

Furthermore, as shown in FIGS. 9, 10, and 11, a roller 127 and tailgate 128, which also functions as a ramp, are provided at the back edge of the body 105. A vertical plate 129 is also provided at the front end of the body 105.

When the lowering drive action of the lift cylinder 111 (extension of the cylinder) drives the lift arm 108 forward and down, the lift frame 103 descends to a down (DN) position approximately parallel to the chassis (position shown in FIG. 9), and when the lift cylinder 111 retracts to rock the lift arm 108 up in a lifting operation, the front of the lift frame 103 rises, the back descends, and the lift frame 103 rides to a tilted UP position (the position shown in FIG. 10 and FIG. 11).

In addition, the body 105 is moved forward to the front position F on the lift frame 103 by a forward drive operation of the hydraulic motor 110 in the hydraulic drive unit U (FIG. 9 and FIG. 10), and is moved back to the back position B on the road 114 by a back drive operation of the hydraulic motor 110 in the hydraulic drive unit U (FIG. 11).

Figure 8:
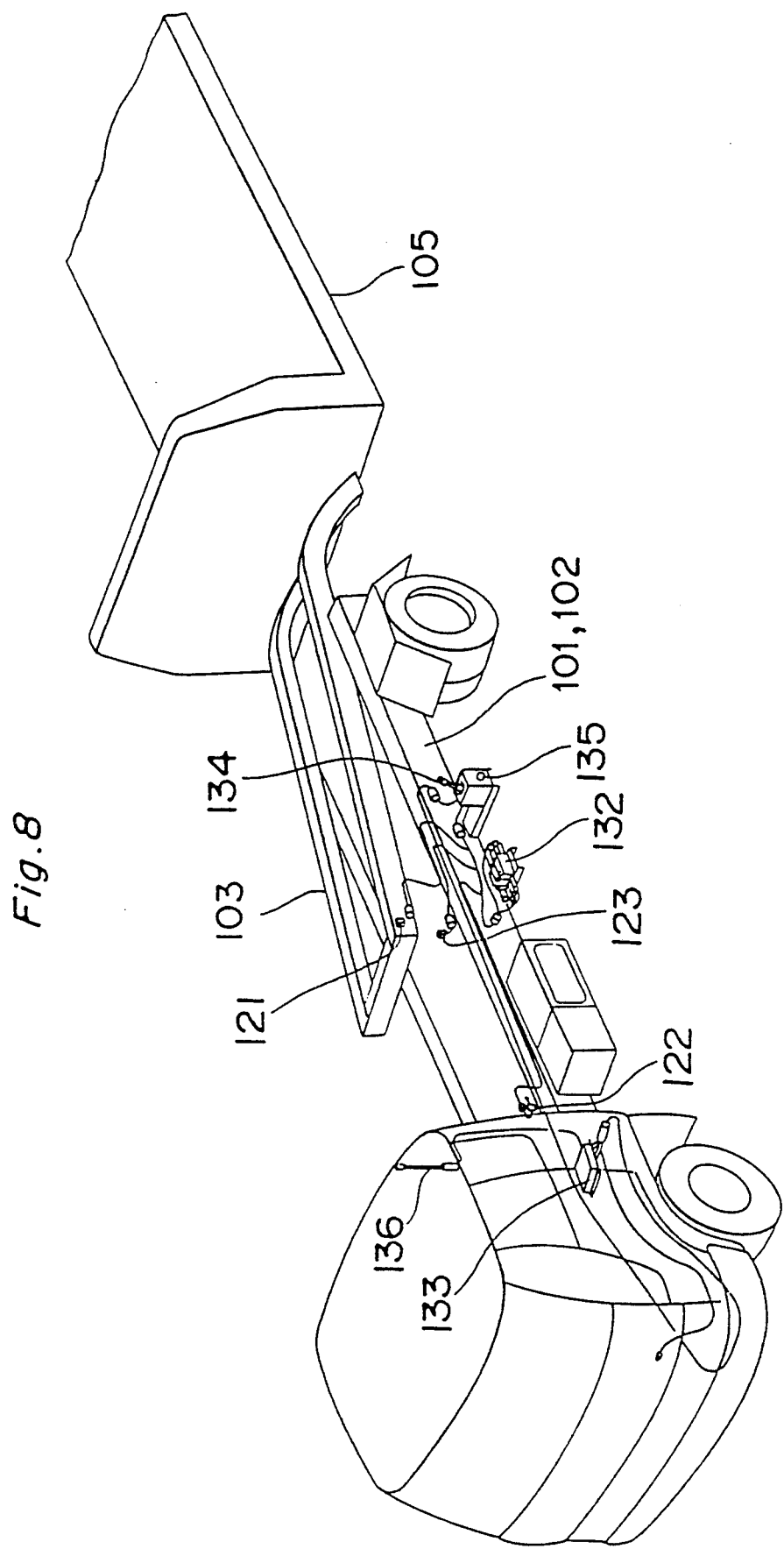
FIG. 8 is a perspective view of the positional relationship of limit switches in a cargo truck according to a second embodiment of the present invention.
Figure 14:
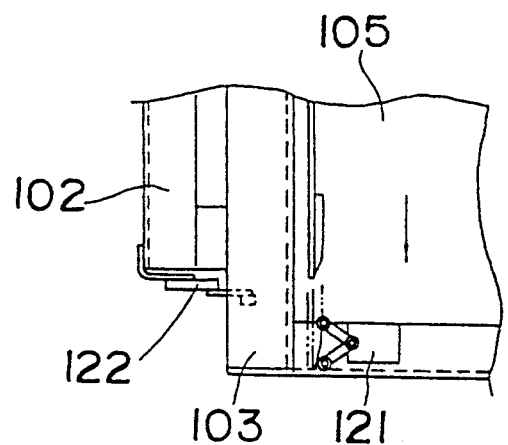
FIG. 14 is a plan view of the components in FIG. 13.

As shown in FIG. 8, a first limit switch 121 (a first detection means) which detects a front position F of the body 5 is provided at the front of the lift frame 103 (FIGS. 13 and 14), a second limit switch 122 (a second detection means) which detects the down DN position of the lift frame 103 is provided at the front of the subframe 102 (FIGS. 13 and 14), and a third limit switch 123 (a third detection means) which detects the UP position of the lift frame 103 from the lifting action of the lift arm 108 is provided at approximately the center in the lengthwise direction of the subframe 102. Note that the third limit switch 123 may also be provided in a position where it can directly detect the UP position of the lift frame 103.

As shown in FIG. 8, the limit switches 121 to 123 are provided between a multiple control valve 132, a radio receiver 133, and a lever switch 134. Using a selector switch 135, a switching operation of the radio receiver 133 by means of a manually operated radio transmitter (not shown in the figure) or the manual switching by means of a switch lever 134 can be selected. Note that reference number 136 is an antenna for the radio receiver 133.

Figure 16:
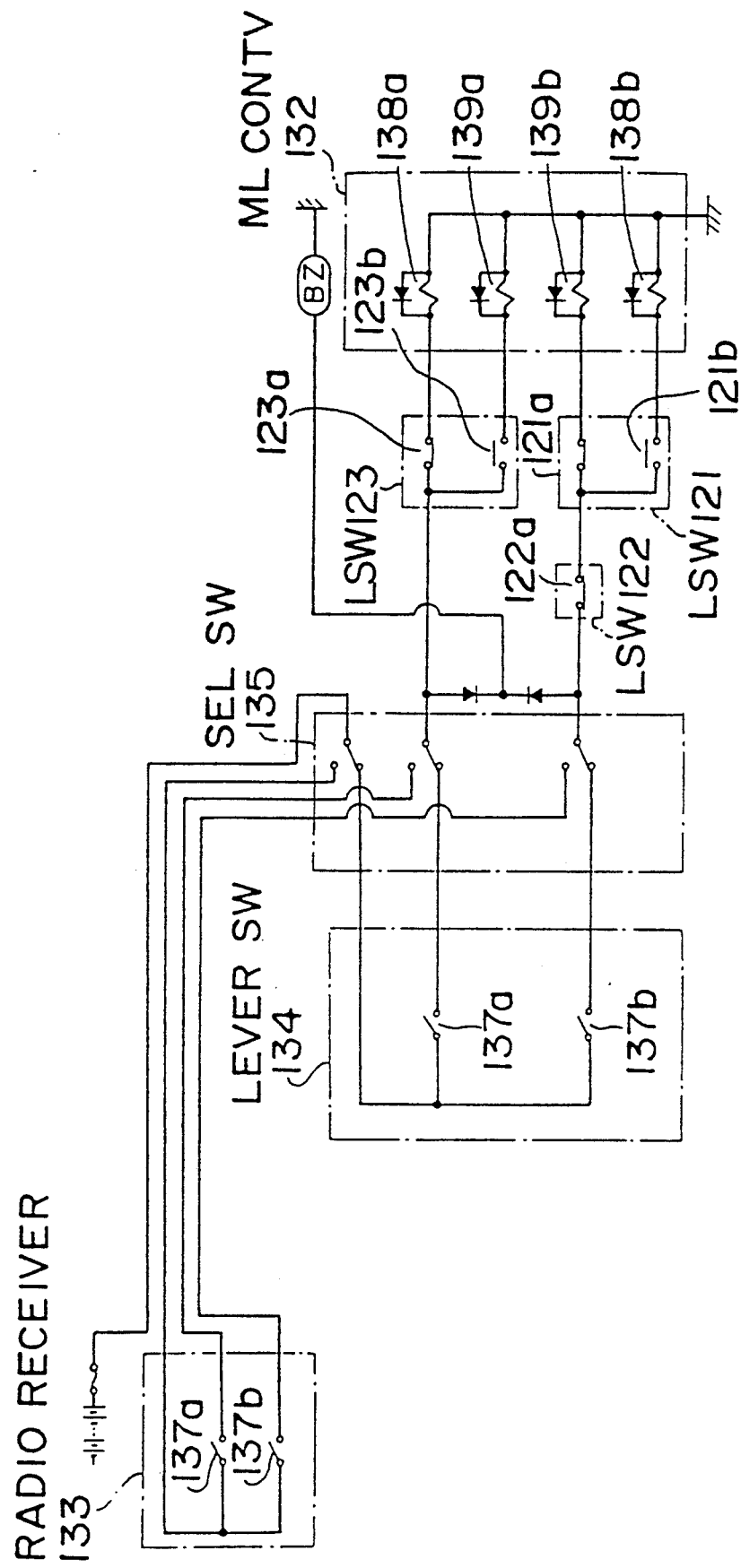
FIG. 16 is a schematic diagram of an electrical circuit.

As shown in FIG. 16, a backward movement switch 137a and forward movement switch 137b for the body 105 are provided in both the radio receiver 133 and the lever switch 134, and operation by the radio receiver 133 only or the lever switch 134 only can be selected by the selector switch 135.

The third limit switch 123, connected to the backward movement switch 137a of the body 105, comprises a first contact 123a and a second contact 123b.

The first contact 123a of the third limit switch 123 is ON before the UP position of the lift frame 103 is detected by the third limit switch 123, and is OFF when the UP position is detected.

The second contact 123b is OFF before the UP position of the lift frame 103 is detected by the third limit switch 123, and is ON when the UP position is detected.

Figure 15:
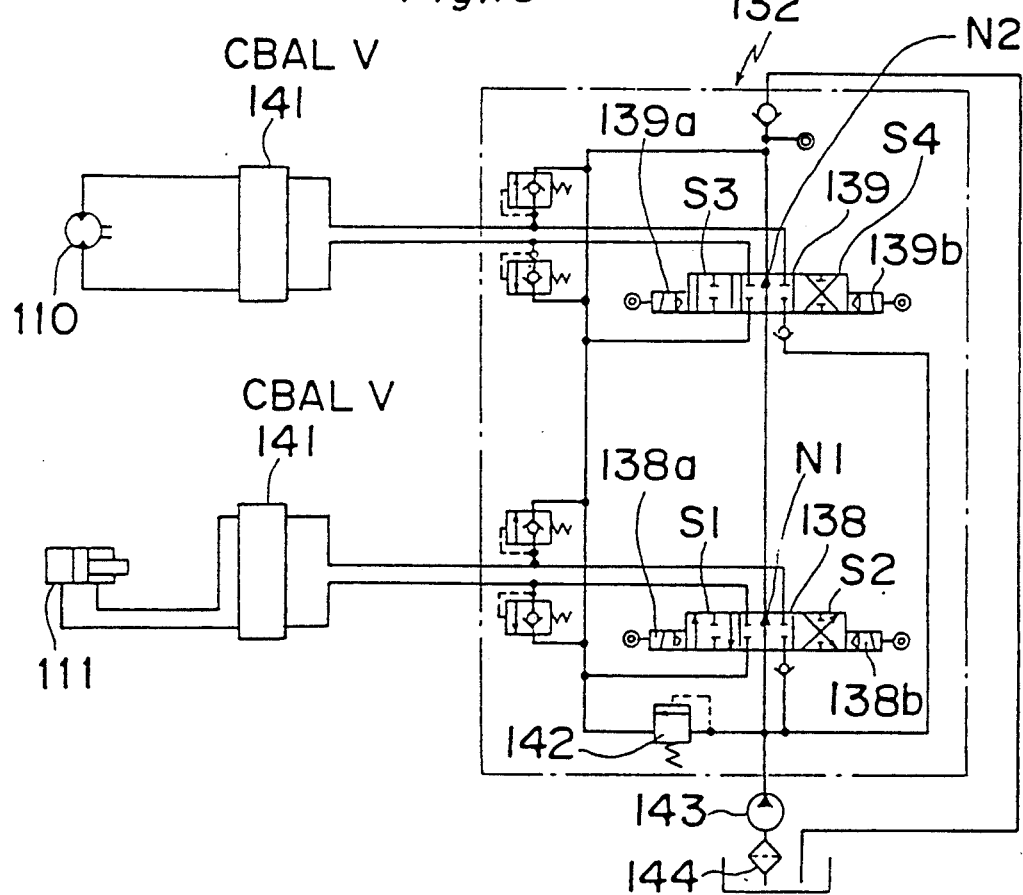
FIG. 15 is a schematic diagram of a hydraulic circuit.

To the first contact 123a is connected a solenoid 138a of a first solenoid selector valve 138 comprising solenoids 138a and 138b of the multiple control valve 132 shown in FIG. 15, and to the second contact 123b is connected a solenoid 139a of a second solenoid selector valve 139 comprising the solenoids 139a and 139b of the multiple control valve 132.

The second limit switch 122 and first limit switch 121 are serially connected to the forward movement switch 137b of the body 105. The second limit switch 122 has a contact 122a, and the first limit switch 121 has a first contact 121a and a second contact 121b serially connected to the contact 122a of the second limit switch 122.

The contact 122a of the second limit switch 122 is ON before the second limit switch 122 detects the down DN position of the lift frame 103, and is OFF when the down position is detected.

The first contact 121a of the first limit switch 121 is ON before the front F position of the body 105 is detected, and is OFF when the front position is detected.

The second contact 121b of the first limit switch 121 is OFF before the front F position of the body 105 is detected, and is ON when the front position is detected. The solenoid 139b of the second solenoid selector valve 139 of the multiple control valve 132 shown in FIG. 8 is connected to the first contact 121a of the first limit switch 121, and the solenoid 138b of the first solenoid selector valve 138 of the multiple control valve 132 is connected to the second contact 121b.

As shown in FIG. 15, the first solenoid selector valve 138 of the multiple control valve 132 switches to position S1 and drives the lift cylinder 111 in a lifting action when the solenoid 138a is on, and switches to the position S2 to drive the lift cylinder 111 in a lowering action when the solenoid 138b is ON.

Furthermore, the second solenoid selector valve 139 switches to position S3 to drive the hydraulic motor 110 in a reverse direction when the solenoid 139a is ON, and switches to position S4 to drive the hydraulic motor 110 in a forward direction when the solenoid 139b is OFF.

It is to be noted that reference numbers 141 are counterbalance valves, 142 is a relief valve, 143 is a hydraulic pump, and 144 is a strainer.

In the following description it is assumed that a cargo truck as described above is positioned with the body 105 in the back position B and the lift frame 103 in the UP position (FIG. 11).

At this time the first contact 121a of the first limit switch 121 is ON and the second contact 121b is OFF, the contact 122d of the second limit switch 122 is ON, and the first contact 123a and second contact 123b of the third limit switch 123 are ON and OFF, respectively (FIG. 16).

When the operator turns the body forward switch 137b of the lever switch 134 (or the radio receiver 133) on after loading a motor vehicle A on the body 105, the solenoid 139b of the second solenoid selector valve 139 is turned on via the contact 122a of the second limit switch 122 and the first contact 121a of the first limit switch 121, thus causing the second solenoid selector value 139 to switch to position S4 and driving the hydraulic motor 110 in a forward direction.

The body 105 thus slides forward along the lift frame 103.

When the body 105 advances to the front F position on the lift frame 103 and thus trips the first limit switch 121, the first contact 121a of the first limit switch 121 becomes OFF and the second contact 121b becomes on.

When the first contact 121a becomes off, the solenoid 139b of the second solenoid selector valve 139 becomes off, and the second solenoid selector valve 139 switches to the neutral position N2, thereby stopping the forward drive action of the hydraulic motor 110.

When the second contact 121b becomes ON, the solenoid 138a of the first solenoid selector valve 138 becomes on, the first solenoid selector valve 138 switches to position S2, and drives the lift cylinder 111 in a lowering action.

Thus, the lift arm 108 is driven forward and down, sliding the lift frame 103 forward and lowering it to the down DN position, at which point the second limit switch 122 is tripped and the contact 122a of the second limit switch 122 becomes OFF.

When the contact 122a becomes off, the solenoid 138b becomes off, the first solenoid selector valve 138 switches to the neutral position N1, and stops the lowering drive action of the lift cylinder 111.

Thus, by simply turning the forward movement switch 137b on, the body 105 at the back position B on the road 114 is automatically moved forward to the front F position on the lift frame 103, and the lift frame 103 in the UP position can be automatically lowered to the down DN position.

Next, when the operator presses the backward movement switch 137a in the lever switch 134 (or the radio receiver 133), the solenoid 138a of the first solenoid selector valve 138 is turned on via the first contact 123a of the third limit switch 123, the first solenoid selector valve switches to position S1, and drives the lift cylinder 111 in a lifting action.

Thus, the lift arm 108 is raised, causing the lift frame 103 to slide to the back and tilt so that the back end descends towards the ground until the UP position is reached. This causes the lift arm 108 to trip the third limit switch 123, turning the first contact 123a of the third limit switch 123 OFF and the second contact 123b ON.

When the first contact 123a turns OFF, the solenoid 138a of the first solenoid selector valve 138 becomes off, the first selector valve switches to the neutral position N1, and stops the lifting action of the lift cylinder 111.

Furthermore, when the second contact 123b is ON, the solenoid 139a of the second solenoid selector valve 139 becomes on, the second solenoid selector valve 139 switches to position S3, and the hydraulic motor 110 is driven in a reverse drive direction.

Thus, the body 5 slides to the back along the lift frame 103, and the front edge is lowered along the curved member 106 to the back position B on the road 114.

When the body 105 has been driven back to the back position B, the load of the reverse drive operation of the hydraulic motor 110 is greatest, and oil from the hydraulic pump 143 is released by the relief valve 142. It is to be noted that a limit switch to detect the back position B of the body 105 may be separately provided so that the solenoid 139b becomes OFF and switches to the neutral position N2 to stop the back drive operation of the hydraulic motor 110 when the back position B is detected.

Thus, by simply switching the backward movement switch 137a of the body 105 ON, a lift frame 103 in the down DN position can be automatically lifted to the UP position, and the body 105 in the front F position can be automatically moved back to the back position B.

As will be known from the above description, a cargo truck according to a second embodiment of the invention can automatically move a body in the back position on the road to the front position on the lift frame, and can thereafter lower the lift frame in the up position to the down position, with a simple manual operation of a body forward movement switch.

Therefore, the timing of the forward movement of the body and the downward movement of the lift frame can be accurately controlled without extensive operator training, and damage to the body and lift frame can be prevented.

Furthermore, a cargo truck according to the second embodiment of the invention can automatically raise a lift frame in the down position on the chassis to an up position, and can thereafter move a body in the forward position on the lift frame to the back position on the road with a simple manual operation of a body backward movement switch.

Therefore, the timing of the upward movement of the lift frame and the backward movement of the body can be accurately controlled without extensive operator training, and damage to the body and lift frame can be prevented.

Third Embodiment

Figure 18:
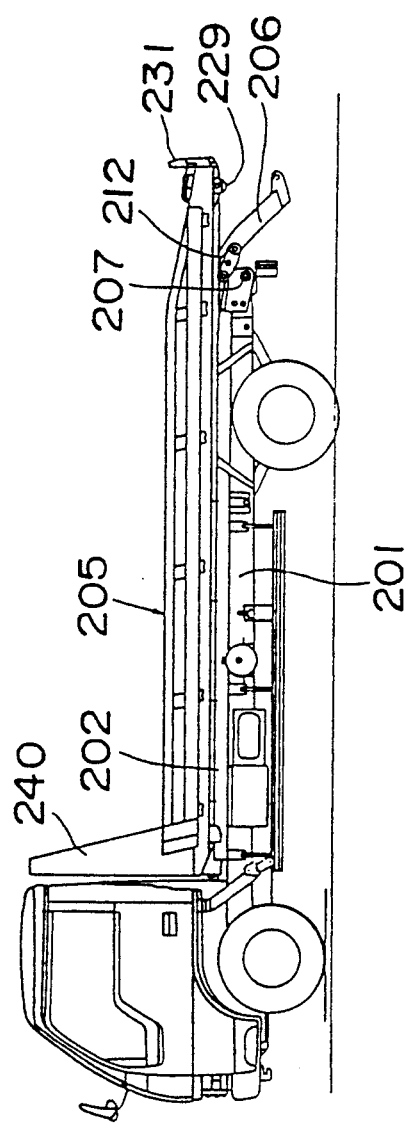
FIGS. 18 and 19 are side views of the operation of a cargo truck according to a third embodiment of the present invention.
Figure 19:
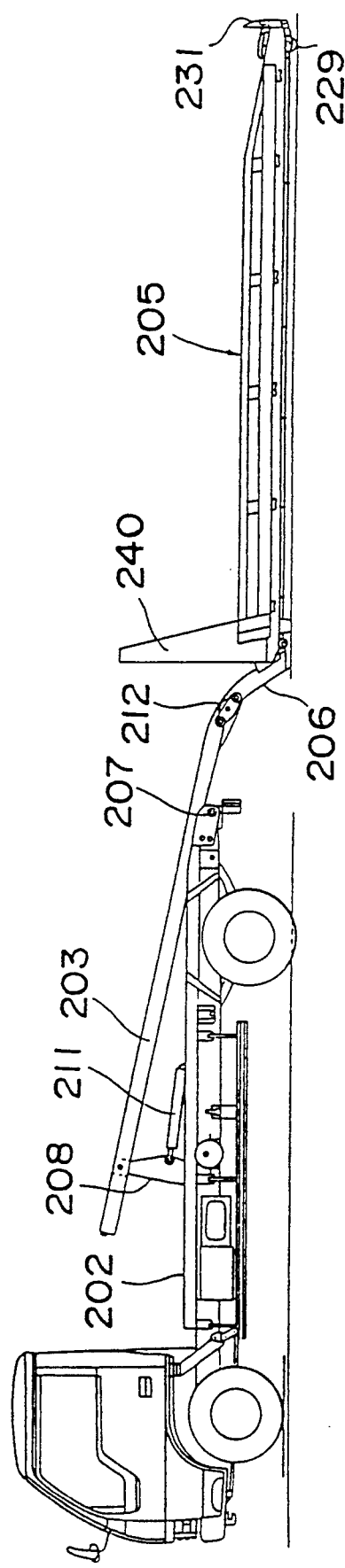
Figure 20:
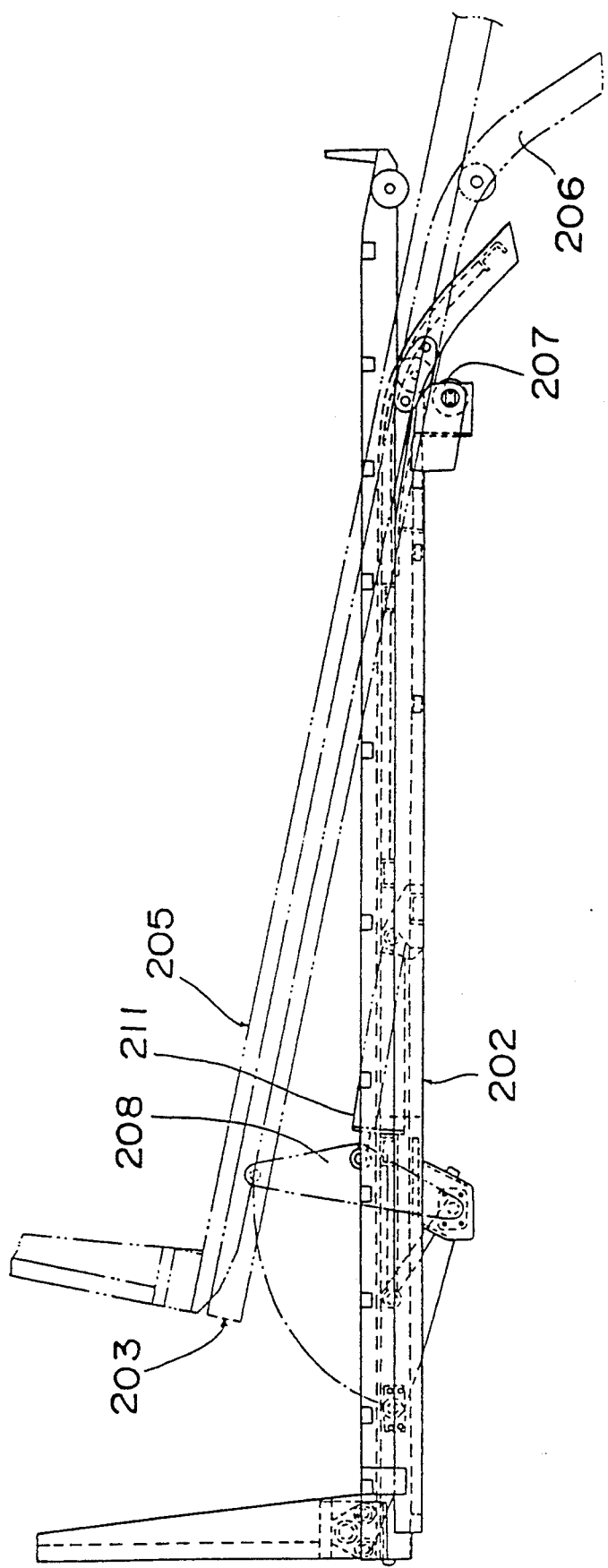
FIG. 20 is a side view of the operation of a lift arm in the third embodiment.

As shown in FIGS. 18 and 19, this third embodiment comprises a chassis frame 201, subframe 202, lift frame 203, and body 205. The chassis frame 201 and the subframe 202 together form the chassis. The lift frame 203 has a curved member 206 which curves down toward the ground at the back end of the lift frame 203, and as shown in FIG. 20, can be slid over hinge rollers 207 at the bottom back of the subframe 202.

At the front end of the lift frame 203 pivots one end of a lift arm 208, the other end of which pivots at the bottom side of the subframe 202. At approximately the center of the lift arm 208 pivots one end of a lift cylinder 211, the other end of which pivots on the subframe 202, in such a manner that when the lift cylinder 211 is retracted, the lift arm 208 rocks up to slide the lift frame 203 back over the hinge rollers 207 and tilt the lift frame 203 up so that the back edge thereof descends toward the ground. Because one end of the lift arm 208 pivots at a position on the bottom side of the subframe 202, the maximum slope of the lift frame 203 and the body 205 can be reduced, and the lift frame 203 and body 205 can be safely tilted.

As shown in FIG. 19, the bottom end of the curved member 206 at the back of the lift frame 203 almost contacts the ground when the lift frame 203 is slid all the way back and down as far as it will travel at an angle. The lift arm 208 and the lift cylinder 211 together form a lift frame drive means.

A body guide roller 212 is provided at a point which is the boundary line between a horizontal member and the curved member 206 in the lift frame 203 to guide the body 205 as it slides along the lift frame 203.

Figure 21:
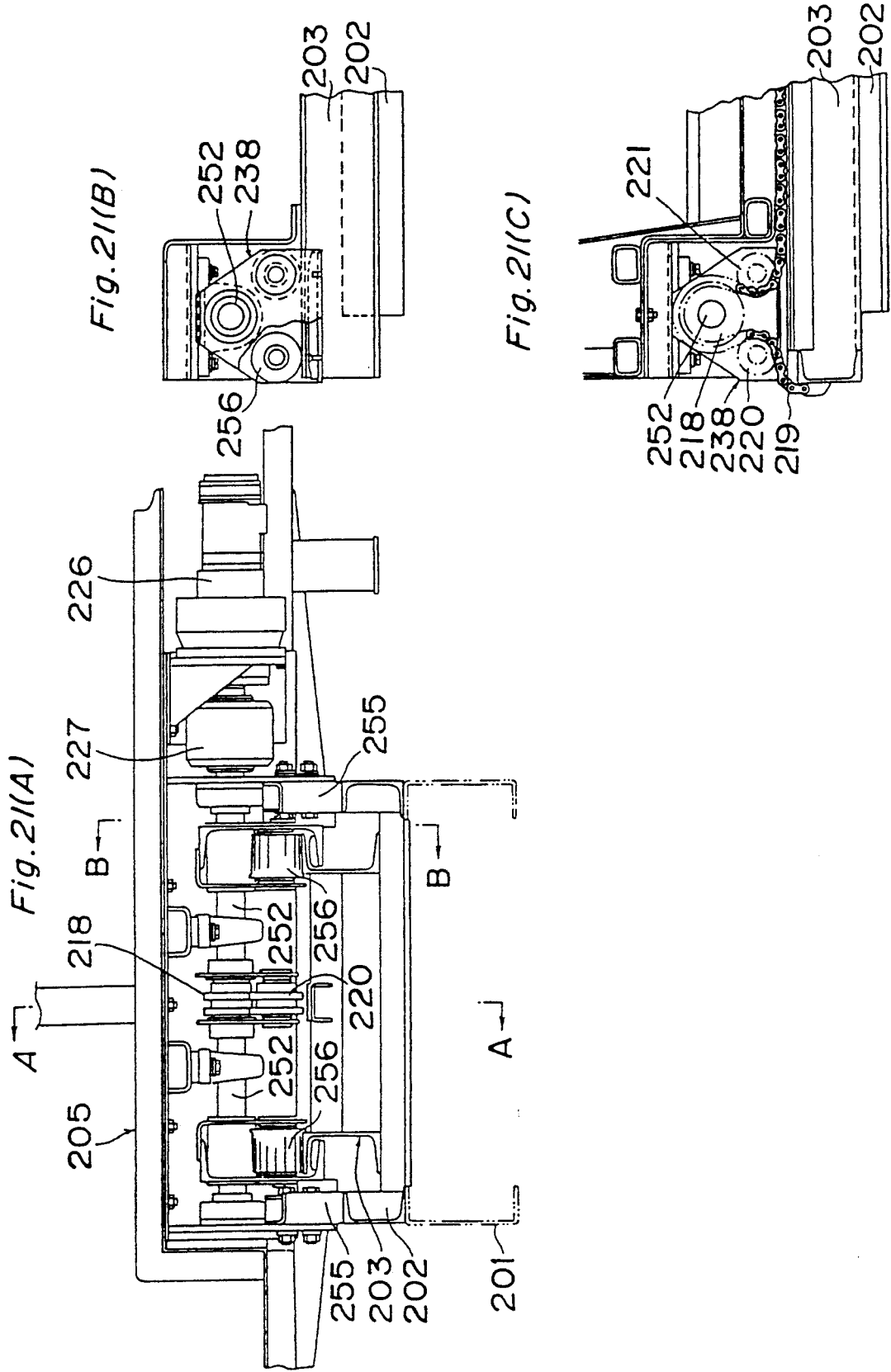
FIGS. 21(A)-21(C) are detailed views of a body drive means of the third embodiment.
Figure 22:
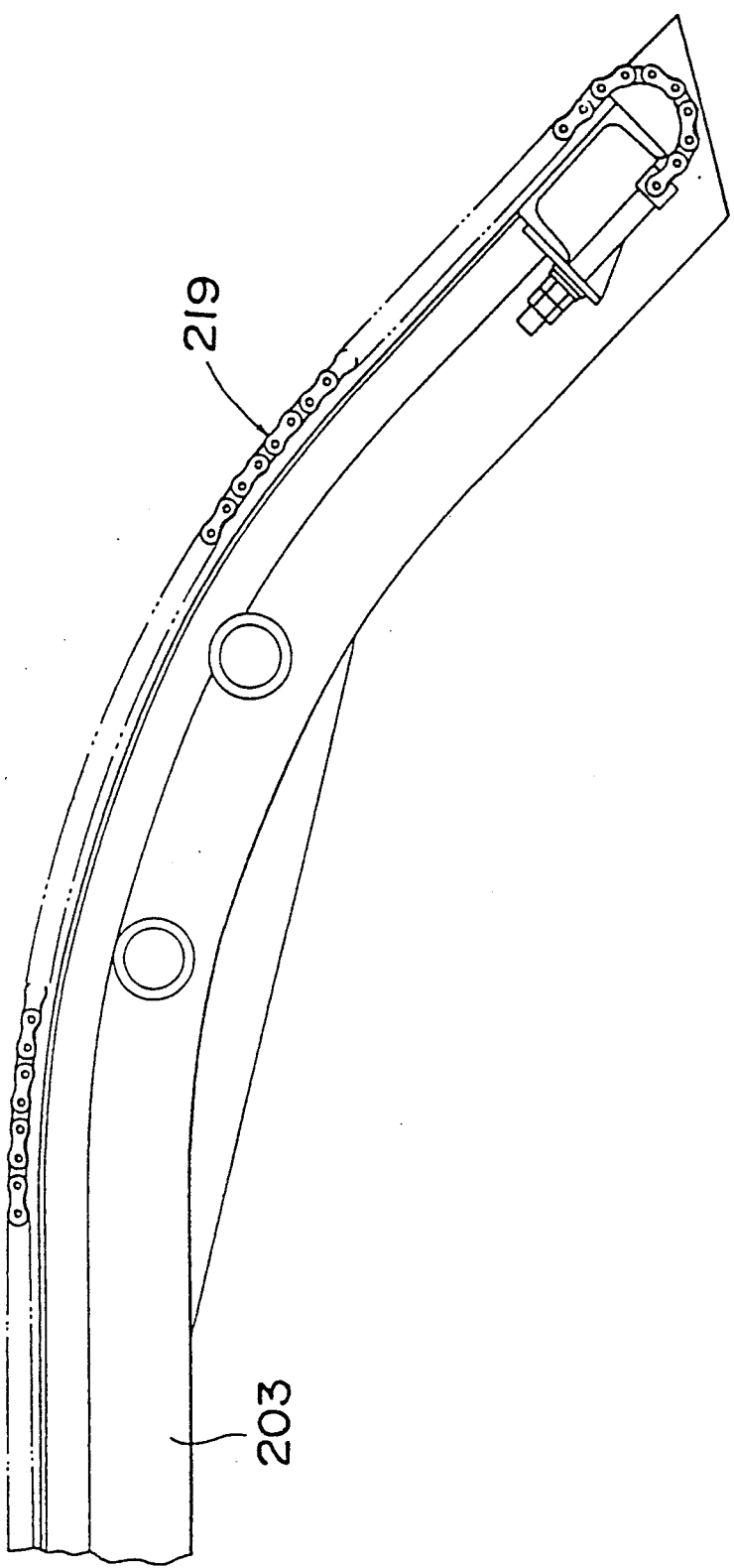
FIG. 22 is a diagram of the rear of the lift arm in the third embodiment.

The body 205 can be moved by the assembly as shown in FIGS. 21 and 22. Specifically, as shown in FIG. 21 (C) and FIG. 22, a chain 219, one end of which is fixed to the front end of the lift frame 203 and the other end of which is fixed to the back end of the lift frame 203, is mounted on a drive sprocket 218 and a pair of idlers 220 and 221 provided at the front end of the body 205. As shown in FIG. 21 (A), the sprocket 218 is fixed to a drive shaft 252, which is driven via a coupling 227 by a hydraulic motor 226 fixed at the front end of the body 205. As shown in FIGS. 21 (A) and (B), guide rollers 256 and main members 255 are provided on the body 205 to support the body 205 on the lift frame 203 and the subframe 202. As shown in FIG. 21 (C), the pair of idlers 220 and 221 are mounted on a bracket 238, which is mounted on the drive shaft 252 in a freely pivoting manner. This bracket 238 is shown in detail in FIGS. 23 (A), (B), and (C).

As shown in FIGS. 23 (A), (B) and (C), this bracket 238 comprises plates 237, bosses 235 which are fit to the drive shaft 252 through nylon bushings 232, pins 230 and 231 which support the idlers 220 and 221 through nylon bushings 233, and bosses 236 which are fit on the pins 230 and 231, and support members 234 which are welded to the ends of the pins 230 and 231 and are bolted to the bosses 236.

When the front of the body 205 slides along the curved member 206 of the lift frame 203, the pair of idlers 220 and 221 rocks with the bracket 238 to stay in line with the curve of the curved member 206 of the lift frame 203, thus holding the fitting of the chain 219, which is secured to the lift frame 203, to the idlers 220 and 221 constant, and preventing the idlers 220 and 221 from applying excess tension to the chain 219. Therefore, by running the sprocket 218 along the chain 219 by driving the hydraulic motor 226, the body 205 can slide smoothly along the entire length of the lift frame 203, including the curved member 206. It is to be noted that the sprocket 218, idlers 220 and 221, chain 219, hydraulic motor 226, and bracket 238 together form the body drive means.

As shown in FIGS. 18 and 19, a roller 229 and tailgate 231, which also functions as a ramp, are provided at the back edge of the body 205. A vertical plate 240 is also provided at the front end of the body 205.

Front and side views of the chassis frame 201, subframe 202, lift frame 203, and body 205 are shown in FIGS. 24 (A) and (B), respectively, and a top view of the body 205 is shown in FIG. 24 (C).

A motor vehicle is loaded onto a cargo truck constructed as thus described as follows.

Figure 25:
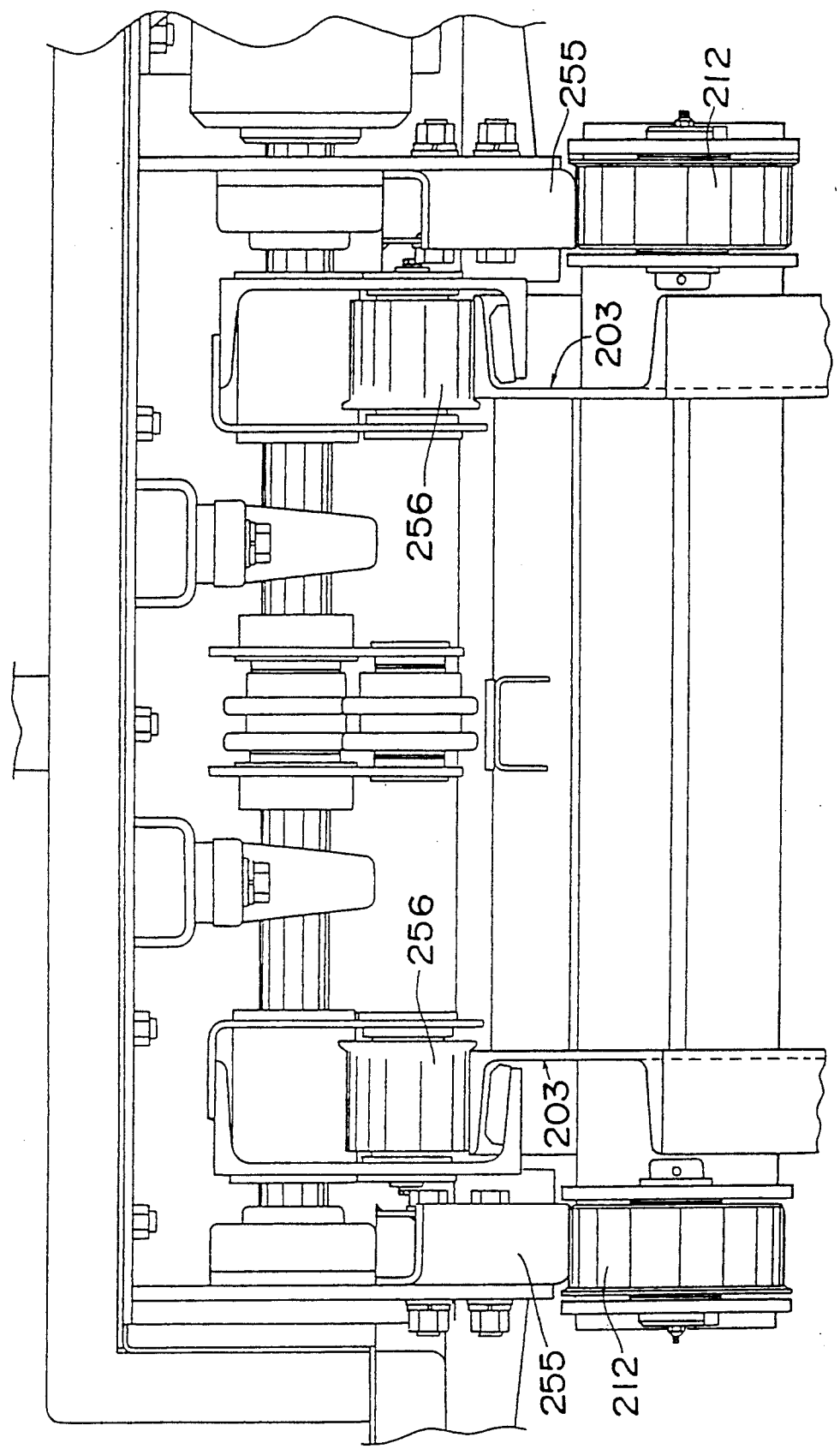
FIG. 25 is a view from the front of the body and lift frame when the lift frame is tilted.

Starting from the position of the cargo truck shown in FIG. 18, the lift cylinder 211 is retracted, causing the lift frame 203 to slide to the back over the rollers 207 by way of the lift arm 208 until it is tilted at the back. As shown in FIG. 25, the guide rollers 256 support the front edge of the body 205 on the lift frame 203 as the body 205 is slid to the back, and the main members 255 contact the rollers 212 at the back of the lift frame 203 to support the back of the body 205 on the lift frame 203.

When the hydraulic motor 226 is driven, the drive sprocket 218 provided at the front of the body 205 travels down the chain 219 tensed along the length of the lift frame 203, thus sliding the body 205 together with the hydraulic motor 226, sprocket 218, and bracket 238 back along the lift frame 203. The bracket 238 on which is mounted the pair of idlers 220 and 221 then rolls, enabling the front edge of the body 205 to descend smoothly along the line of the curved member 206. When the back end of the body 205 descends to the ground, the rollers 229 provided thereon contact the ground and enable the body 205 to travel smoothly back. It is to be noted that the tailgate 231 is raised at this time.

Thus, as the body 205 slides back, the guide rollers 256 support the front edge of the body 205 on the lift frame 203, and the roller 212 at the back end of the lift frame 203 supports the back end and middle of the body 205.

When the body 205 descends to the bottom end of the curved member 206 of the lift frame 203, it is in the position shown in FIG. 19, at which point the body 205 is approximately level with the ground. The tailgate 231 is then lowered to the ground to load the motor vehicle onto the body 205.

Because the motor vehicle can thus be loaded onto the body 205 with the vehicle level, feelings of anxiety are not aroused in the driver, the vehicle can be driven all the way forward onto the body 205, and it is therefore easy to load a motor vehicle onto the truck body. In addition, the driver is able to get out from the loaded vehicle in a manner which is not dangerous because the body 205 and motor vehicle are level with the ground. Moreover, when a motor vehicle or other freight is loaded on to the body 205 in this horizontal position and the freight is secured to the body 205, the freight can be secured more easily and there is no danger of the freight rolling off because the body 205 is in a horizontal position. Furthermore, because freight is loaded with the body 205 in a horizontal position, freight can be loaded not only from the back but also from the sides of the body.

Next, the hydraulic motor 226 is driven to lift the body 205 along the curved member 6 by means of the chain 219 and sprocket 218, and then pull the body 205 forward along the lift frame 203. At this time the bottom end of the curved member 206 of the lift frame 203 is driven down to contact the ground by the weight of the motor vehicle. The curved member 206 of the lift frame 203 thus acts as a supporting member to prevent the cargo truck from rolling back.

After the body 205 is advanced sufficiently forward on the lift frame 203, the lift cylinder 211 is extended to return the lift frame 203 to a horizontal position by way of the lift arm 208 and slide the lift frame 203 forward with respect to the subframe 202 until the position shown in FIG. 18 is resumed.

In this third embodiment the lift frame drive means was comprised of the lift cylinder 211 and the lift arm 208, but it shall not be so limited and may be of any construction which is able to tilt and slide the lift frame. Furthermore, the lift frame 203 in this embodiment is able to slide along the subframe 202, but it may also be constructed to slide along the chassis frame without using a subframe.

As will be known from the above description, because a pair of idlers to which are mounted a chain provided on the lift frame is engaged bracket which is mounted in a freely pivoting manner to a drive shaft driven by a motor mounted on the front of the body, when the front of the body slides along the curved member of the lift frame, the pair of idlers rocks together with the bracket according to the movement of the body to follow the curve of the curved member and maintain an engaging situation between the idlers and the chain provided in the lift frame in a cargo truck according to a third embodiment of the present invention. Therefore, the body can be slid smoothly along a lift frame having a curved member on a cargo truck according to the third embodiment.

Fourth Embodiment

Figure 26:
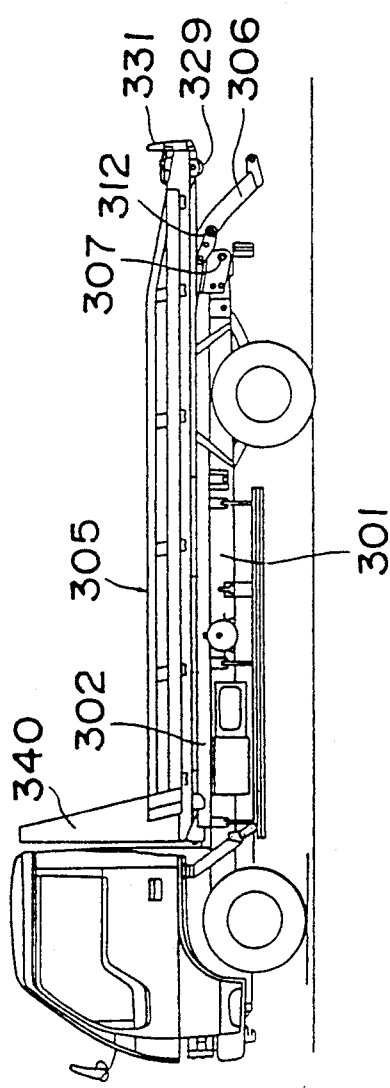
FIGS. 26 and 27 are side view diagrams of the operation of a cargo truck according to a fourth embodiment of the present invention.
Figure 27:
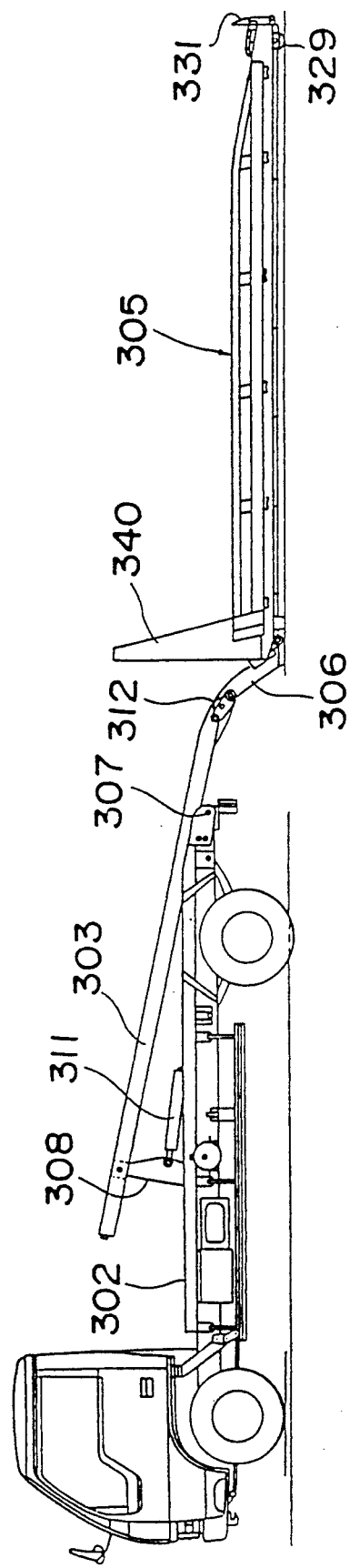
Figure 28:
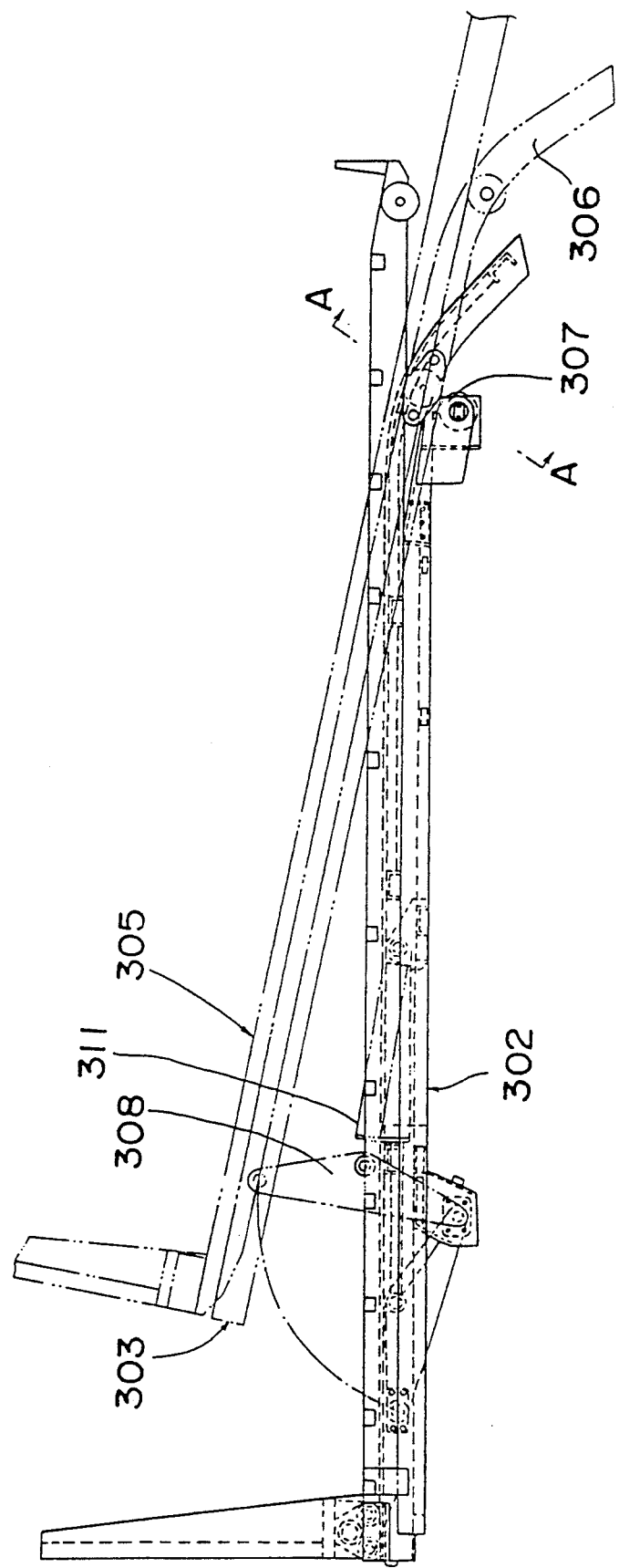
FIG. 28 is a diagram of the operation of a lift frame in the fourth embodiment.

As shown in FIGS. 26 and 27, the fourth embodiment comprises a chassis frame 301, subframe 302, lift frame 303, and body 305. The chassis frame 301 and the subframe 302 together form the chassis. The lift frame 303 has a curved member 306 which curves down toward the ground at the back end of the lift frame 303, and as shown in FIG. 28, can be slid over hinge rollers 307 at the bottom back of the subframe 302.

Figure 29:
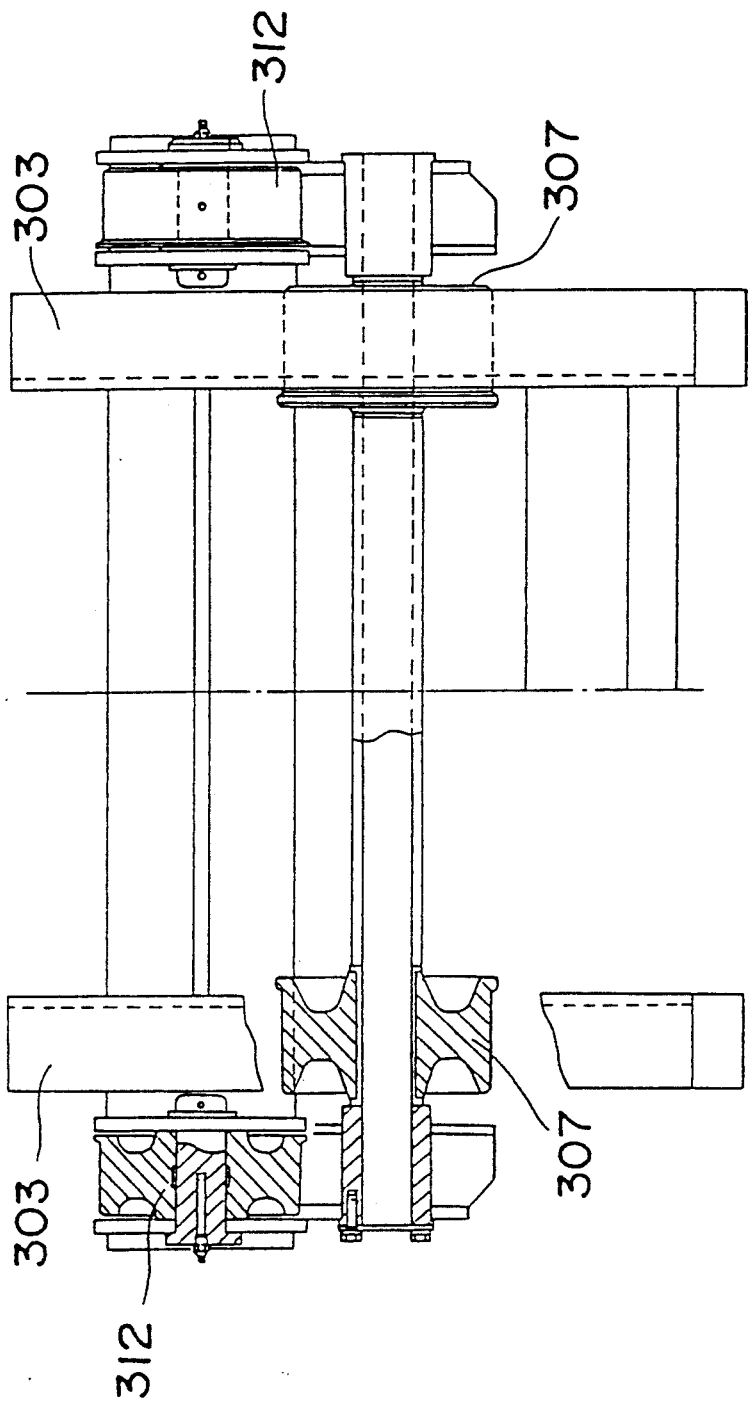
FIG. 29 is a partial cross sectional view of an area near hinge rollers in the fourth embodiment.

A body guide roller 312 is provided at a boundary point between a horizontal member and the curved member 306 in the lift frame 303 to guide the body 305 as it slides along the lift frame 303. A half cross section at line A—A in FIG. 28 through the hinge rollers 307 and roller 312 is shown in FIG. 29.

At the front end of the lift frame 303 pivots one end of a lift arm 308, the other end of which pivots at the bottom side of the subframe 302. At approximately the center of the lift arm 308 pivots one end of a lift cylinder 311, the other end of which pivots on the subframe 302, in such a manner that when the lift cylinder 311 is retracted, the lift arm 308 rocks up to slide back over the hinge rollers 307 and tilt the lift frame 303 up so that the back edge thereof descends toward the ground. Because one end of the lift arm 308 pivots at a position on the bottom side of the subframe 302, the maximum slope of the lift frame 303 and the body 305 can be reduced, and the lift frame 303 and body 305 can be safely tilted.

As shown in FIG. 27, the bottom end of the curved member 306 at the back of the lift frame 303 almost contacts the ground when the lift frame 303 is slid all the way back and down as far as it will travel at an angle. The lift arm 308 and the lift cylinder 311 together form the lift frame drive means.

The body 305 can be moved by the assembly as shown in FIGS. 30 and 31. Specifically, as shown in FIG. 30 (C) and FIG. 31, a chain 319, one end of which is fixed to the front end of the lift frame 303 and the other end of which is fixed to the back end of the lift frame 303, is mounted on a drive sprocket 318 and a pair of idlers 320 and 321 provided at the front end of the body 305. A chain guide 323 is also provided on the lift frame 303 to prevent the chain 319 from sagging.

As shown in FIG. 30 (A), the sprocket 318 is driven by means of a coupling 327 and a drive shaft 352 driven by a hydraulic motor 326 fixed to the body 305 through a housing 351. As shown in FIG. 30 (A), the main members 355 of the body 305 contact the top of the subframe 302 to support the body 305, and the guide rollers 356 on the body 305 similarly contact the top of the lift frame 303 to support the body 305 as shown in FIGS. 30 (A) and (B).

By driving the sprocket 318 along the chain 319 by driving the hydraulic motor 326, the body 305 can slide along the complete length of the lift frame 303, including the curved member 306 thereof. As shown in FIG. 30 (A), the housing 351 is bolted to the front of the body 305 by means of nine bolts 357, including five top locations and four side locations. The housing 351, hydraulic motor 326, drive shaft 352, and sprocket 318 comprise the drive unit U. In addition, the drive unit U and chain 319 comprise the body drive means. All components of the hydraulic motor 326 and other parts comprising the drive unit U except for the housing 351 are assembled inside the housing 351. Therefore, because the drive unit U, which is the assembly that drives the body 305, is bolted in a removable manner to the body 305 as a single assembly using nine bolts 357, the drive unit U can be easily and simply mounted to and removed from the body 305, and maintenance, inspection, and repair of the drive unit U is easy.

Figure 32C:
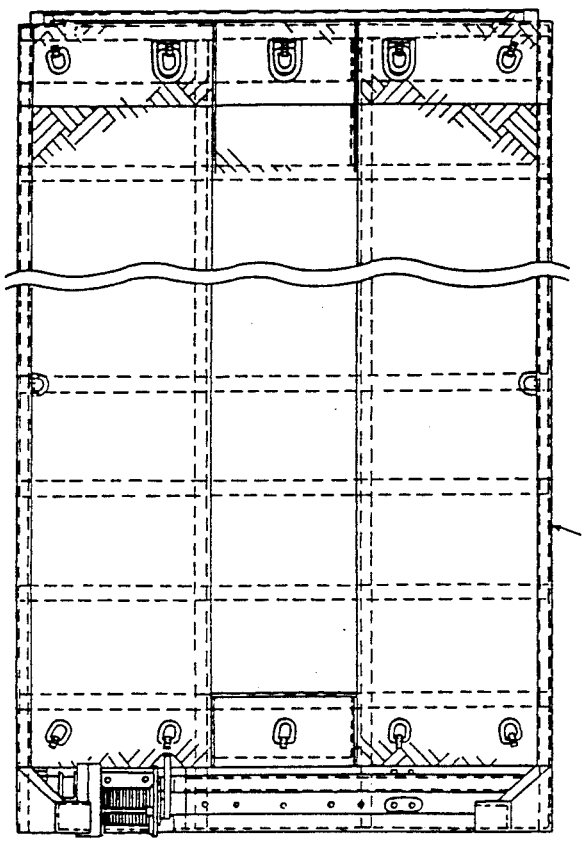
Figure 32B:
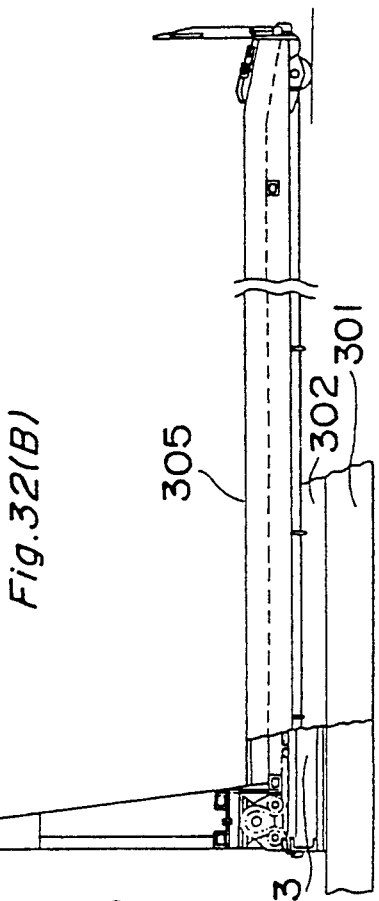
Figure 32A:
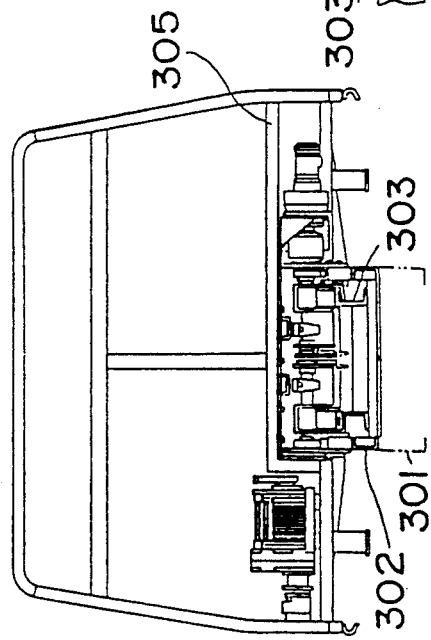

A front view of the body 305, lift frame 303, subframe 302, and chassis frame 301 is shown in FIG. 32 (A), a side view of the body 305, lift frame 303, subframe 302, and chassis frame 301 is shown in FIG. 32 (B), and a top view of the body 305 is shown in FIG. 32 (C).

In addition, as shown in FIGS. 26 and 27, a roller 329 and tailgate 331, which also functions as a ramp, are provided at the back edge of the body 305. A vertical plate 340 is also provided at the front end of the body 305.

A motor vehicle is loaded onto a cargo truck constructed as thus described as follows.

Starting from the position of the cargo truck shown in FIG. 26, the lift cylinder 311 is retracted, causing the lift frame 303 to slide to the back over the rollers 307 by way of the lift arm 308 until it is tilted at the back.

When the hydraulic motor 326 is driven, the drive sprocket 318 provided at the front of the body 305 travels down the chain 319 tensed along the length of the lift frame 303, thus sliding the body 305 together with the drive unit U comprising the hydraulic motor 326 and sprocket 318 back along the lift frame 303, and lowering the front edge of the body 305 along the curved member 306. When the back end of the body 305 descends to the ground, the rollers 329 provided thereon contact the ground and enable the body 305 to travel smoothly back. It is to be noted that the tailgate 331 is raised at this time.

Thus, as the body 305 slides back, the guide rollers 356 support the front edge of the body 305 on the lift frame 303, and the roller 312 at the back end of the lift frame 303 supports the back end and middle of the body 305.

When the body 305 descends to the bottom end of the curved member 306 of the lift frame 303, it is in the position shown in FIG. 27, at which point the body 305 is approximately level with the ground. The tailgate 331 is then lowered to the ground to load the motor vehicle on to the body 305.

Because the motor vehicle can thus be loaded onto the body 305 with the vehicle level, feelings of anxiety are not aroused in the driver, the vehicle can be driven all the way forward onto the body 305, and it is therefore easy to load a motor vehicle onto the truck body. In addition, the driver is able to get out from the loaded vehicle in a manner which is not dangerous because the body 305 and motor vehicle are level with the ground. Moreover, when a motor vehicle or other freight is loaded on to the body 305 in this horizontal position and the freight is secured to the body 305, the freight can be secured more easily and there is no danger of the freight rolling off because the body 305 is in a horizontal position. Furthermore, because freight is loaded with the body 305 in a horizontal position, freight can be loaded not only from the back but also from the sides of the body.

Next, the hydraulic motor 326 is driven to lift the body 305 along the curved member 6 by means of the chain 319 and sprocket 318, and then pull the body 305 forward along the lift frame 303. At this time the bottom end of the curved member 306 of the lift frame 303 is driven down to contact the ground by the weight of the motor vehicle. The curved member 306 of the lift frame 303 thus acts as a block to prevent the cargo truck from rolling back.

After the body 305 is advanced sufficiently forward on the lift frame 303, the lift cylinder 311 is extended to return the lift frame 303 to a horizontal position by way of the lift arm 308 and slide the lift frame 303 forward with respect to the subframe 302 until the position shown in FIG. 26 is resumed.

The drive unit U is installed as described below.

The hydraulic motor 326, drive shaft 352, and sprocket 318 are first assembled into the housing 351, thus forming the drive unit U. Next, the drive unit U is mounted to the body 305 by bolting the housing 351 to the body 305 using nine bolts. The drive unit U is removed by simply removing the nine bolts. In other words, because the drive unit U is mounted as a single assembly to the body 305 by simply bolting the housing 351 to the body 305 using nine bolts, installation and removal of the drive unit U to the body 305 can be completed simply and easily, and maintenance, inspection, and repair of the drive unit U is therefore simple.

In this fourth embodiment the lift frame drive means was comprised of the lift cylinder 311 and the lift arm 308, but it shall not be so limited and may be of any construction which is able to tilt and slide the lift frame. Furthermore, the lift frame 303 in this embodiment is able to slide along the subframe 302, but it may also be constructed to slide along the chassis frame 301 without using a subframe.

As will be known from the above description, because a drive unit comprising a housing, a motor, a drive shaft which is driven by said motor, and a sprocket on which is mounted a chain provided on the lift frame and which is fixed to the drive shaft is bolted through the housing thereof to the front of the body in a removable manner, the drive unit, which is the device which drives the body, can be easily and simply mounted to and removed from the body using bolts, and the drive unit can be easily maintained, inspected, and repaired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cargo truck, comprising:
    a truck chassis;
    a lift frame mounted on said chassis of said truck so as to be tiltable and slidable on said chassis, said lift frame including, at a rear end thereof, a curved member curving downwardly;
    a lift frame drive means for tilting said lift frame relative to said chassis and sliding said lift frame relative to said chassis;
    a pallet body slidably mounted on said lift frame; and
    a pallet body drive means for sliding said pallet body on said lift frame, including said curved member curving downwardly, between a raised position wherein said pallet body is on said lift frame and a lowered position wherein said pallet body has been lowered to the ground and is substantially parallel to the ground;
    wherein said pallet body drive means comprises a motor, a sprocket connected to said motor so as to be rotated thereby, and a chain extending from one end of said lift frame to the other, said sprocket engaging said chain such that rotation of said sprocket by said motor causes relative movement between said pallet body and said lift frame; and
    wherein said motor is mounted on said pallet body, said chain has one end thereof fixed to a forward end of said lift frame and an opposite end fixed to a rear end of said lift frame.

2. The cargo trunk of claim 1, wherein said sprocket engages said chain together with a pair of idlers adjacent to said sprocket on said pallet body.

3. The cargo truck of claim 1, wherein said pallet body drive means include a housing removably mounted on said pallet body, said motor and said sprocket being mounted in said housing.

4. A cargo truck, comprising:
    a truck chassis;
    a lift frame mounted on said chassis of said truck so as to be tiltable and slidable on said chassis, said lift frame including, at a rear end thereof, a curved member curving downwardly;
    a lift frame drive means for tilting said lift frame relative to said chassis and sliding said lift frame relative to said chassis;
    a pallet body slidably mounted on said lift frame; and
    a pallet body drive means for sliding said pallet body on said lift frame, including said curved member curving downwardly, between a raised position wherein said pallet body is on said lift frame and a lowered position wherein said pallet body has been lowered to the ground and is substantially parallel to the ground;
    wherein said lift frame comprises a plurality of longitudinally extending members defining a horizontal member and said curved member, and said pallet body has rollers mounted at a forward end thereof rollingly engaging said longitudinally extending members; and
    wherein said rollers are rotatably mounted on brackets, and said brackets are pivotably mounted on said forward end of said pallet body.

5. The cargo truck of claim 4, wherein said longitudinally extending members of said lift frame have an upper flange with an upper and a lower surface, said rollers rolling on said upper surface, and said pallet body having a guide plate and a pad for engaging said lower surface.

6. A cargo truck, comprising:
    a truck chassis;
    a lift frame mounted on said chassis of said truck so as to be tiltable and slidable on said chassis, said lift frame including, at a rear end thereof, a curved member curving downwardly;
    a lift frame drive means for tilting said lift frame relative to said chassis and sliding said lift frame relative to said chassis;
    a pallet body slidably mounted on said lift frame; and
    a pallet body drive means for sliding said pallet body on said lift frame, including said curved member curving downwardly, between a raised position wherein said pallet body is on said lift frame and a lowered position wherein said pallet body has been lowered to the ground and is substantially parallel to the ground;
    wherein said lift frame drive means moves said lift frame between a down position substantially parallel to said truck chassis and an up position where the front end of said lift frame is raised and the rear end of said lift frame is lowered, and said pallet body drive means moves said pallet body between a front position on said lift frame and a back position on the ground, said cargo truck further comprising:

a first detection means for detecting when said pallet body is in said front position;

a second detection means for detecting when said lift frame is in said down position;

a pallet body forward movement switch; and a control means for controlling said lift frame drive means and said pallet body drive means in response to said first detection means, said second detection means and said pallet body forward movement switch such that, when said pallet body forward movement switch is actuated and said pallet body is in said back position, said pallet body drive means moves said pallet body forward and stops forward movement of said pallet body when said first detection means detects said pallet body at said front position, said lift drive means then being actuated to lower said lift frame and subsequently stop lowering said lift frame when said second detection means detects said lift frame at said down position.

7. The cargo truck of claim 6, and further comprising:

a third detection means for detecting when said lift frame is in said up position; and a backward pallet body movement switch;

wherein said control means further controls, said lift frame drive means and said pallet body drive means in response to said third detection means and said backward pallet body movement switch such that, when said backward pallet body movement switch is actuated and said pallet body is in said forward position, said lift frame drive means raises said lift frame until said third detection means detects said lift frame in said up position, whereupon said lift frame drive means is stopped and said pallet body drive means is started to move said pallet body backward until said pallet body has reached said back position.

8. A cargo truck, comprising:

a truck chassis;

a lift frame mounted on said chassis of said truck so as to be tiltable and slidable on said chassis, said lift frame including, at a rear end thereof, a curved member curving downwardly;

a lift frame drive means for tilting said lift frame relative to said chassis and sliding said lift frame relative to said chassis;

a pallet body slidably mounted on said lift frame; and a pallet body drive means for sliding said pallet body on said lift frame, including said curved member curving downwardly, between a raised position wherein said pallet body is on said lift frame and a lowered position wherein said pallet body has been lowered to the ground and is substantially parallel to the ground;

wherein said lift frame drive means moves said lift frame between a down position substantially parallel to said truck chassis and an up position where the front end of said lift frame is raised and the rear end of said lift frame is lowered and said pallet body drive means moves said pallet body between a front position on said lift frame and a back position on the ground, said cargo truck further comprising:

a detection means for detecting when said lift frame is in said up position;

a backward pallet body movement switch; and a control means for controlling said lift frame drive means and said pallet body drive means in response to said detection means and said backward pallet body movement switch such that, when said backward pallet body movement switch is actuated and said pallet body is in said forward position, said lift frame drive means raises said lift frame until said detection means detects said lift frame in said up position, whereupon said lift frame drive means is stopped and said pallet body drive means is started to move said pallet body backward until said pallet body has reached said back position.

9. A cargo truck, comprising:

a truck chassis;

a lift frame mounted on said chassis of said truck so as to be tiltable and slidable on said chassis, said lift frame including, at a rear end thereof, a curved member curving downwardly;

a lift frame drive means for tilting said lift frame relative to said chassis and sliding said lift frame relative to said chassis;

a pallet body slidably mounted on said lift frame; and a pallet body drive means for sliding said pallet body on said lift frame, including said curved member curving downwardly, between a raised position wherein said pallet body is on said lift frame and a lowered position wherein said pallet body has been lowered to the ground and is substantially parallel to the ground;

wherein said pallet body drive means comprises:

a motor driving a drive shaft mounted at the front of said pallet body;

a chain provided on said lift frame;

a sprocket fixed to said drive shaft, said sprocket engaging said chain;

a bracket freely pivotable mounted to said drive shaft; and a pair of idlers mounted on said bracket engaging said chain.

10. A cargo truck, comprising:

a truck chassis;

a lift frame mounted no said chassis of said truck so as to be tiltable and slidable on said chassis, said lift frame including, at a rear end thereof, a curved member curving downwardly;

a lift frame drive means for tilting said lift frame relative to said chassis and sliding said lift frame relative to said chassis;

a pallet body slidably mounted on said lift frame; and a pallet body drive means for sliding said pallet body on said lift frame, including said curved member curving downwardly, between a raised position wherein said pallet body is on said lift frame and a lowered position wherein said pallet body has been lowered to the ground and is substantially parallel to the ground;

wherein said pallet body drive means comprises:

a chain provided on said lift frame; and a motor, a drive shaft driven by said motor, a sprocket fixed to said shaft and engaged with said chain, and a housing mounting said motor therein, said housing being removably fixed to the front of said pallet body by a plurality of bolts.

* * * * *